(12) United States Patent
Furuta et al.

(10) Patent No.: US 9,025,279 B2
(45) Date of Patent: May 5, 2015

(54) PRESSURE-SENSITIVE ADHESIVE SHEET AND MAGNETIC DISK DRIVE

(71) Applicant: Nitto Denko Corporation, Ibaraki-shi, Osaka (JP)

(72) Inventors: Kenji Furuta, Osaka (JP); Rie Nakahira, Osaka (JP); Yoshihisa Furuta, Osaka (JP); Koichi Ikeda, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/185,369

(22) Filed: Feb. 20, 2014

(65) Prior Publication Data

US 2014/0240869 A1    Aug. 28, 2014

(30) Foreign Application Priority Data

Feb. 26, 2013  (JP) ................................ 2013-036194

(51) Int. Cl.
  *G11B 33/14*  (2006.01)
  *B32B 15/00*  (2006.01)

(52) U.S. Cl.
  CPC ..... *G11B 33/1446* (2013.01); *Y10T 428/24975* (2013.01); *B32B 15/00* (2013.01); *G11B 33/1466* (2013.01)

(58) Field of Classification Search
  CPC ............................ G11B 33/1446; B32B 15/00
  USPC .................................. 360/97.12, 99.19, 99.21
  See application file for complete search history.

(56) References Cited

U.S. PATENT DOCUMENTS

| | | | |
|---|---|---|---|
| 5,079,058 A * | 1/1992 | Tomiyama et al. | 428/41.2 |
| 5,262,242 A * | 11/1993 | Tomiyama et al. | 428/423.1 |
| 5,482,779 A * | 1/1996 | Bausewein et al. | 428/488.41 |
| 6,151,294 A * | 11/2000 | Parlog et al. | 720/718 |
| 6,636,378 B2 * | 10/2003 | Tokunaga et al. | 360/99.19 |
| 6,822,823 B1 * | 11/2004 | Tsuwako et al. | 360/99.18 |
| 6,903,898 B2 * | 6/2005 | Nonaka et al. | 360/99.19 |
| 7,196,867 B2 * | 3/2007 | Nonaka et al. | 360/97.12 |
| 7,206,164 B2 * | 4/2007 | Hofland et al. | 360/97.11 |
| 7,522,375 B2 | 4/2009 | Tsuda et al. | |
| 7,570,455 B2 * | 8/2009 | Deguchi et al. | 360/99.21 |
| 2005/0048302 A1 * | 3/2005 | Sakurai et al. | 428/500 |
| 2006/0176610 A1 | 8/2006 | Tsuda et al. | |
| 2007/0104913 A1 * | 5/2007 | Nonaka et al. | 428/40.1 |
| 2011/0212281 A1 * | 9/2011 | Jacoby et al. | 428/35.8 |

FOREIGN PATENT DOCUMENTS

JP    2006-190412 A    7/2006

* cited by examiner

*Primary Examiner* — Angel Castro
(74) *Attorney, Agent, or Firm* — Sughrue Mion, PLLC

(57) ABSTRACT

A pressure-sensitive adhesive sheet according to the present invention includes a base including a metal layer, a first plastic film layer A, and a second plastic film layer B and a pressure-sensitive adhesive layer on a surface of the second plastic film B. The metal layer is positioned between the first plastic film layer A and the second plastic film layer B. The metal layer has a thickness of 2 μm to 15 μm. A total of a thickness Ta of the first plastic film layer A and a thickness Tb of the second plastic film layer B is within a range of 25 μm to 70 μm.

8 Claims, 12 Drawing Sheets

PRESSURE-SENSITIVE ADHESIVE SHEET AND MAGNETIC DISK DRIVE

CROSS-REFERENCE TO RELATED APPLICATION

This application claims priority from Japanese Patent Applications No. 2013-036194 filed on Feb. 26, 2013. The entire contents of the priority application are incorporated herein by reference.

TECHNICAL FIELD

The present disclosure relates to a pressure-sensitive adhesive sheet and a magnetic disk drive.

BACKGROUND

Patent Document 1 discloses a magnetic disk drive that includes a base member having an open topped box-like shape and configured to house a magnetic disk, for example, and a plate-shaped cover attached to an inner opening edge of the base member.

In this kind of magnetic disk drive, the cover covers the opening of the base member like a drop-lid. In other words, the cover is smaller than the opening of the base member, and thus a small gap is provided between an edge of the opening and an edge of the cover.

Foreign substances such as moisture and siloxane compound (cyclic siloxane, for example), which are present outside the magnetic disk drive, may enter the magnetic disk drive through the gap. The foreign substances such as moisture and siloxane compound may cause damage to the magnetic disk drive, and thus it is desired to minimize the possibility of entry of the foreign substances into the drive.

To minimize the possibility, a pressure-sensitive adhesive sheet, which is referred to as a pressure-sensitive adhesive sheet cover seal, is attached to cover an entire front surface of the magnetic disk drive. Specifically, the pressure-sensitive adhesive sheet is attached such that a circumferential part thereof extends over an opening edge of the base member and a circumferential edge of the cover to seal the gap.

It is intended to have air tightness in the magnetic disk drive by sealing the gap with the pressure-sensitive adhesive sheet.

Patent Document 1: Japanese Unexamined Patent Application Publication No. 2006-190412

SUMMARY

A pressure-sensitive adhesive sheet includes a base including a metal layer, a first plastic film layer A, and a second plastic film layer B and a pressure-sensitive adhesive layer on a surface of the second plastic film B. The metal layer is positioned between the first plastic film layer A and the second plastic film layer B. The metal layer has a thickness of 2 µm to 15 µm. A total of a thickness Ta of the first plastic film layer A and a thickness Tb of the second plastic film layer B is within a range of 25 µm to 70 µm.

DETAILED DESCRIPTION

Figure 1:
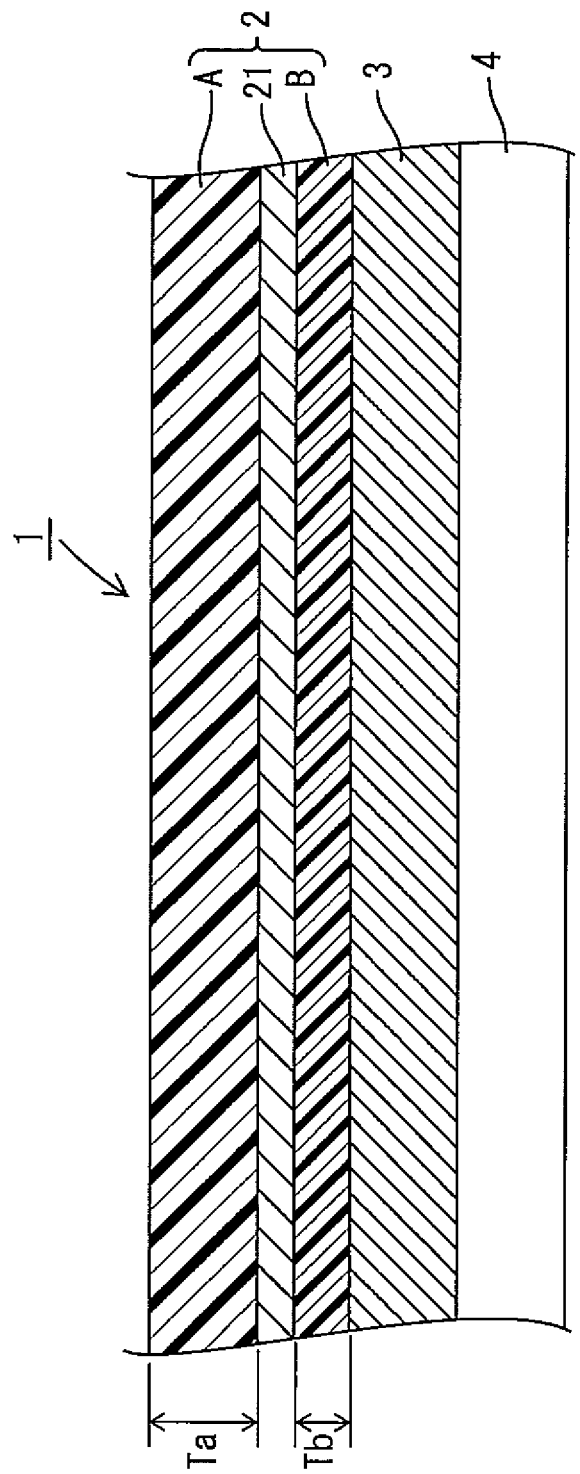
FIG. 1 is a schematic cross-sectional view of a pressure-sensitive adhesive sheet according to an embodiment.

This kind of adhesive sheet is likely to have wrinkles when the sheet is attached to an object such as a magnetic disk drive.

For example, the pressure-sensitive adhesive sheet that is attached to the magnetic disk drive having the above configuration may have wrinkles in an area between the opening edge of the base and the circumferential edge of the cover in a direction intersecting the gap. The wrinkles have a mountain like shape that is formed by a protruded part of the pressure-sensitive adhesive sheet. The wrinkles have a structure like a tunnel that connects outside the magnetic disk drive and the gap. The wrinkles are passages that lead the foreign substances such as moisture and siloxane compound into the magnetic disk drive. The wrinkles may deteriorate the air tightness of the magnetic disk drive.

The pressure-sensitive adhesive sheet that has wrinkles needs to be detached and a new adhesive sheet needs to be attached to the magnetic disk drive.

The present invention was made to solve the above described problems and to achieve the following objects. An object of the present invention is to provide a pressure-sensitive adhesive sheet that hardly has wrinkles when the sheet is attached to an object.

Another object of the present invention is to provide a magnetic disk drive that includes a cover seal including the above pressure-sensitive adhesive sheet.

The inventors of the present invention conducted an intensive study and found that the following pressure-sensitive adhesive sheet hardly have wrinkles when attached to an object. The pressure-sensitive adhesive sheet includes a base including a metal layer, a first plastic film layer A, and a second plastic film layer B and a pressure-sensitive adhesive layer on a surface of the second plastic film B. The metal layer is positioned between the first plastic film layer A and the second plastic film layer B. The metal layer has a thickness of 2 µm to 15 µm. A total of a thickness Ta of the first plastic film layer A and a thickness Tb of the second plastic film layer B is within a range of 25 µm to 70 µm.

In the pressure-sensitive adhesive sheet, the base may have a total thickness of 40 µm to 90 µm.

In the pressure-sensitive adhesive sheet, the thickness Ta of the first plastic film layer A may be larger than the thickness Tb of the second plastic film layer B.

In the pressure-sensitive adhesive sheet, a ratio (Ta/Tb) of the thickness Ta of the first plastic film layer A to the thickness Tb of the second plastic film layer B may be within a range of 1.5 to 7.0.

In the pressure-sensitive adhesive sheet, a ratio (Ta/Tb) of the thickness Ta of the first plastic film layer A to the thickness Tb of the second plastic film layer B may be within a range of 2.0 to 4.0.

The pressure-sensitive adhesive sheet may be a cover seal used in a magnetic disk drive.

In the pressure-sensitive adhesive sheet, the pressure-sensitive adhesive sheet may be a cover seal used in a magnetic disk drive. The magnetic disk drive may include a magnetic disk unit including a magnetic disk, a head unit including a magnetic head configured to read or write information on the magnetic disk, a base member having a box like shape with an opening at one side and including a frame shaped end portion extending around the opening, a cover attached to the base member and covering the opening of the base member, and the cover seal attached over the frame shaped end portion and the cover such that the cover seal covers the gap. The base member may house the magnetic disk unit and the head unit therein. The cover may have an outer peripheral portion positioned away from an inner peripheral portion of the frame shaped end portion with a gap therebetween.

A magnetic disk drive according to the present invention includes: a magnetic disk unit including a magnetic disk; a head unit including a magnetic head configured to read or write information on the magnetic disk; a base member having a box like shape with an opening at one side and including a frame shaped end portion extending around the opening, a cover attached to the base member and covering the opening of the base member, and a cover seal attached over the frame shaped end portion and the cover such that the cover seal covers the gap. The cover seal is the pressure-sensitive adhesive sheet. The base member houses the magnetic disk unit and the head unit therein. The cover has an outer peripheral portion positioned away from an inner peripheral portion of the frame shaped end portion with a gap therebetween A cover seal for a magnetic disk drive, according to the present invention, includes the above-described pressure-sensitive adhesive sheet.

According to an aspect of the present invention, the problems of known pressure-sensitive adhesive sheets can be resolved and a pressure-sensitive adhesive sheet that hardly has wrinkles when the sheet is attached to an object can be provided. In addition, according to another aspect of the present invention, a magnetic disk drive that includes a cover seal including the pressure-sensitive adhesive sheet can be provided.

Hereinafter, an embodiment of the present invention will be described with reference to the drawings.

A cross-sectional view of a pressure-sensitive adhesive sheet 1 according to an embodiment of the present invention is schematically illustrated in FIG. 1. As illustrated in FIG. 1, the pressure-sensitive adhesive sheet 1 includes a base 2 and a pressure-sensitive adhesive layer 3 on the base 2. In this embodiment, as illustrated in FIG. 1, the pressure-sensitive adhesive sheet 1 before use (before the sheet 1 is attached to an object) includes a release linear 4 that is attached to a surface of the pressure-sensitive adhesive layer 3 of the pressure-sensitive adhesive sheet 1.

The pressure-sensitive adhesive sheet may also be referred to by a different name such as a pressure-sensitive adhesive tape and a pressure-sensitive adhesive film. The term "pressure-sensitive adhesive sheet" is used throughout this specification. A surface of the pressure-sensitive adhesive layer of the pressure-sensitive adhesive sheet may be referred to as an "adhesive surface".

The pressure-sensitive adhesive sheet 1 of the present embodiment may include other layers, such as an intermediate layer, an undercoat, and a laminate layer, in addition to the base 2 and the pressure-sensitive adhesive layer 3 as long as the pressure-sensitive adhesive sheet 1 can achieve the object of the present invention. Hereinafter, components of the pressure-sensitive adhesive sheet 1 will be described in detail.

(Base 2)

The base 2 is a member on which the pressure-sensitive adhesive layer 3 is formed and provides rigidity to the pressure-sensitive adhesive sheet 1. The base 2 includes a metal layer 21, a first plastic film layer A, and a second plastic film layer B. The first plastic film layer A is disposed on a surface of the metal layer 21 and the second plastic film layer B is disposed on the other surface of the metal layer 21.

The metal layer 21 and the first and second plastic film layers A, B, which are included in the base 2, are laminated by a known laminating process such as dry laminating process. A laminate layer may be formed between the metal layer 21 and the first plastic film layer A and/or the second plastic film layer B. A side on which the first plastic film layer A is disposed is a front side and the other side on which the second plastic film layer B is disposed is a rear side. The pressure-sensitive adhesive layer 3 is formed on the rear side of the base 2.

The base 2 preferably has a thickness (a total thickness) of 40 μm to 90 μm, more preferably 40 μm to 75 μm, and further more preferably 45 μm to 75 μm. The pressure-sensitive adhesive sheet 1 including the base 2 within the above thickness (total thickness) can have proper rigidity and be thin.

One or both surfaces of the base 2 may be subjected to a known surface treatment, for example, a chemical or physical treatment, such as chromic acid treatment, ozone exposure, flame exposure, high-pressure electrical-shock exposure, and ionization radiation treatment, or may be coated with a primer. For example, the surface of the second plastic film layer B disposed on the rear side of the base 2 may be subjected to the surface treatment to improve adhesion between the surface of the second plastic film layer B and the pressure-sensitive adhesive layer 3.

<Metal Layer 21>

The metal layer 21 may be a layer made of metal material such as aluminum, copper, silver, iron, nickel, tin, and stainless steel. The metal layer 21 may be made of a metal foil or a metal film that is formed by a known film formation method such as a deposition method and a sputtering method. The metal layer 21 may be preferably made of an aluminum layer, because the pressure-sensitive adhesive sheet 1 including the metal layer made of aluminum layer hardly has wrinkles.

The metal layer 21 preferably has a thickness of 2 μm to 15 μm, more preferably 4 μm to 13 μm, and further preferably 6 μm to 11 μm. The pressure-sensitive adhesive sheet 1 including the metal layer 21 within the above thickness hardly has wrinkles when the pressure-sensitive adhesive sheet 1 is attached to an object.

<First Plastic Film Layer A>

The first plastic film layer A is disposed on the front side of the base 2 and made of plastic material in a film shape. Examples of the plastic material used for the first plastic film layer A include: polyester resins such as polyethylene terephthalate (PET) and polybutylene terephthalate (PBT); olefin resins such as polyethylene (PE) and polypropylene (PP); polyimide resins such as polyvinyl chloride resins, acrylic resins, vinyl acetate resins, amide resins, and polyimide (PI);

poly(ether ether ketone); and polyphenylene sulfide. The plastic material is preferably polyester resin or polyolefin resin, more preferably polyester resin, and further preferably polyethylene terephthalate (PET), because the pressure-sensitive adhesive sheet 1 including the first plastic film layer A made of such a plastic material can have proper rigidity and hardly has wrinkles.

The first plastic film layer A may be a single layer or may be composed of multiple layers.

The first plastic film layer A preferably has a thickness Ta of 20 µm to 60 µm, and more preferably 22 µm to 55 µm. The thickness Ta of the first plastic film layer A is preferably larger than a thickness Tb of the second plastic film layer B.

<Second Plastic Film Layer B>

The second plastic film layer B is disposed on the rear side and the pressure-sensitive adhesive layer 3 is provided on the plastic film layer B. Like the above-described plastic film layer A, the second plastic film layer B is made of plastic material in a film shape. Examples of the plastic material used for the second plastic film layer B include: polyester resins such as polyethylene terephthalate (PET) and polybutylene terephthalate (PBT); olefin resins such as polyethylene (PE) and polypropylene (PP); polyimide resin such as polyvinyl chloride resin, acrylic resin, vinyl acetate resin, amide resin, and polyimide (PI); polyetheretherketone; and polyphenylene sulfide. The plastic material is preferably polyester resin or polyolefin resin, more preferably polyester resin, and more preferably polyethylene terephthalate (PET), because the pressure-sensitive adhesive sheet 1 including the second plastic film layer B made of such a plastic material can have sufficient rigidity and have less wrinkles, and because the second plastic film layer B made of such a plastic material can have sufficient adhesiveness to the pressure-sensitive adhesive layer 3.

The second plastic film layer B may be a single layer or may be composed of multiple layers.

The second plastic film layer B preferably has the thickness Tb of 5 µm to 15 µm, and more preferably 7 µm to 12 µm.

<Ta+Tb>

A sum (total thickness) of the thickness Ta of the first plastic film layer A and the thickness Tb of the second plastic film layer B is preferably within a range of 25 µm to 70 µm, more preferably 30 µm to 70 µm, and further more preferably 30 µm to 65 µm. The pressure-sensitive adhesive sheet 1 (the base 2) including the first and second plastic film layers A, B that have the total thickness of Ta and Tb within the above range can have proper rigidity and hardly have wrinkles.

<Ta/Tb>

A ratio of the thickness Ta of the first plastic film layer A to the thickness Tb of the second plastic film layer B (Ta/Tb, i.e., a ratio of Ta to Tb) is preferably within a range of 1.5 to 7.0, and more preferably 2.0 to 4.0. The pressure-sensitive adhesive sheet 1 in which Ta/Tb is within the above range hardly has wrinkles when the pressure-sensitive adhesive sheet 1 is attached to an object after the release liner 4 is detached from the pressure-sensitive adhesive layer 3. The pressure-sensitive adhesive sheet 1 in which Ta/Tb is within the range of 1.5 to 7.0 can have sufficient followability to difference in level.

(Pressure-Sensitive Adhesive Layer 3)

The pressure-sensitive adhesive layer 3 is made of acrylic adhesive including acrylic polymer as a main component. The adhesive is produced by adding additives to a mixture of the acrylic polymer and a cross-linking agent. The adhesive (solid material) includes the acrylic polymer as the main component preferably in an amount of 90% by mass or more, and more preferable in an amount of 95% by mass or more, based on the total amount of the adhesive.

The acrylic polymer, which is a base polymer of the pressure-sensitive adhesive layer 3, provides adhesiveness. The acrylic polymer may be a (meth)acrylate alkyl ester polymer which contain a (meth)acrylate alkyl ester (an acrylate alkyl ester and/or a methacrylate alkyl ester) as a main monomer component (main monomer) and which further contain, where necessary, another ethylenically unsaturated monomer as a copolymerizable component (copolymerizable monomer). The (meth)acrylate alkyl esters and the ethylynically unsaturated monomers can be used alone or in a combination of two or more kinds.

Examples of the (meth)acrylic alkyl esters include methyl (meth)acrylates, ethyl(meth)acrylates, propyl(meth)acrylates, isopropyl(meth)acrylates, n-butyl(meth)acrylates, isobutyl(meth)acrylates, sec-butyl(meth)acrylates, t-butyl (meth)acrylates, pentyl(meth)acrylates, isopentyl(meth) acrylates, neopentyl(meth)acrylates, hexyl(meth)acrylates, heptyl(meth)acrylates, octyl(meth)acrylates, isooctyl(meth) acrylates, 2-ethylhexyl(meth)acrylates, nonyl(meth)acrylates, isononyl(meth)acrylates, decyl(meth)acrylates, isodecyl(meth)acrylates, undecyl(meth)acrylates, dodecyl(meth) acrylates, tridecyl(meth)acrylates, tetradecyl(meth) acrylates, pentadecyl(meth)acrylates, hexadecyl(meth) acrylates, heptadecyl(meth)acrylates, octadecyl(meth) acrylates, nonadecyl(meth)acrylates, and eicosyl(meth) acrylates. The (meth)acrylic alkyl ester including an alkyl group with a carbon number of 2 to 14 may be preferred. Examples thereof include ethyl(meth)acrylates, n-butyl (meth)acrylates, isobutyl(meth)acrylates, hexyl(meth)acrylates, 2-ethylhexyl(meth)acrylates, and dodecyl(meth)acrylates.

The (meth)acrylic alkyl ester that is used as a main monomer component is included in 50% by mass or more (50 to 100% by mass), preferably 80% by mass or more, and more preferably 90% by mass or more, based on the total mass of the monomer components. Although the upper limit of the amount of the (meth)acrylic alkyl ester based on the total mass of the monomer components is not particularly limited, the upper limit is preferably 99% by mass or less, and more preferably 97% by mass or less. The acrylic polymer including the (meth)acrylic alkyl ester in the above range can properly exhibit its properties (such as adhesiveness).

The acrylic polymer may contain, as a monomer component, a monomer component (copolymerizable monomer) that can copolymerize with (meth)acrylic alkyl esters. The copolymerizable monomer is contained to introduce crosslinking points into the acrylic polymer and/or to control the cohesive force of the acrylic polymer. The copolymerizable monomers can be used alone or in combination of two or more kinds.

Examples of the copolymerizable monomers include: carboxyl group-containing monomers such as (meth)acrylic acids, itaconic acid, crotonic acid, maleic acid, fumaric acid, isocrotonic acid, and anhydrides of these acids (e.g., maleic anhydride and itaconic anhydride); hydroxyl-group-containing monomers including hydroxyalkyl (meth)acrylates such as 2-hydroxyethyl (meth)acrylates, 2-hydroxypropyl (meth) acrylates, 2-hydroxybutyl (meth)acrylates, 4-hydroxybutyl (meth)acrylates, and 6-hydroxyhexyl (meth)acrylates. Further examples of the copolymerizable monomers include vinyl alcohol and allyl alcohol; amide group-containing monomers such as (meth)acrylamides, N,N-dimethyl(meth) acrylamides, N-butyl(meth)acrylamides, N-methylol(meth) acrylamides, N-methylolpropane(meth)acrylamides, N-methoxymethyl(meth)acrylamides, and N-butoxymethyl (meth)acrylamides; amino group-containing monomers such as aminoethyl(meth)acrylates, N,N-dimethylaminoethyl (meth)acrylates, and t-butylaminoethyl (meth)acrylates; epoxy group-containing monomers such as glycidyl (meth) acrylates and methylglycidyl (meth)acrylates; cyano-containing monomers such as acrylonitrile and methacrylonitrile; monomers having a nitrogen containing ring such as N-vinyl-2-pyrrolidone, N-methyl vinyl pyrrolidone, N-vinyl pyridine, N-vinyl piperidone, N-vinyl pyrimidine, N-vinyl piperazine, N-vinyl pyrazine, N-vinyl pyrrole, N-vinyl imidazole, N-vinyl oxazole, N-vinyl morpholine, N-vinyl caprolactam, and N-(meth)acryloyl morpholine. Examples of the copolymerizable monomer further include: vinyl ester monomers such as vinyl acetate and vinyl propionate; styrenic monomers such as styrene, substituted styrenes (e.g., α-methylstyrene), and vinyltoluene; olefinic monomers such as ethylene, propylene, isoprene, butadiene, and isobutylene; vinyl chloride, vinylidene chloride; isocyanate group-containing monomers such as 2-(meth)acryloyloxyethyl isocyanate; alkoxy-group-containing monomers such as methoxyethyl (meth)acrylates and ethoxyethyl (meth)acrylates; vinyl ether monomers such as methyl vinyl ether and ethyl vinyl ether. Further examples of the copolymerizable monomer includes polyfunctional monomers such as 1,6-hexanediol di(meth)acrylates, butanediol di(meth)acrylates, ethylene glycol di(meth)acrylates, diethylene glycol di(meth)acrylates, triethylene glycol di(meth)acrylates, tetraethylene glycol di(meth)acrylates, (poly)ethylene glycol di(meth)acrylates, propylene glycol di(meth)acrylates, (poly)propylene glycol di(meth)acrylates, neopentyl glycol di(meth)acrylates, pentaerythritol di(meth)acrylates, trimethylolpropane tri(meth)acrylates, pentaerythritol tri(meth)acrylates, dipentaerythritol hexa(meth)acrylates, glycerol di(meth)acrylate, epoxy acrylates, polyester acrylates, urethane acrylates, and divinylbenzene. The copolymerizable monomer is preferably (meth)acrylic acids, itaconic acid, maleic acid, hydroxyethyl (meth)acrylates, hydroxybutyl (meth)acrylates, or hydroxyhexyl (meth)acrylates.

The amount of copolymerizable monomers can be suitably determined according to the types of monomer components so as to be less than 50% by mass based on the total weight of monomer components. For example, when carboxyl group-containing monomer (especially, acrylic acid) is used as the copolymerizable monomer, the amount of the carboxyl group-containing monomer is within a range of 3 to 10% by mass (preferably 5 to 10% by mass, and more preferably 7 to 10% by mass) based on 100% by mass of the total monomer components.

The acrylic polymer can be produced through polymerization of the above-described monomer components by a known polymerization method (technique). Examples of the polymerization method include solution polymerization, emulsion polymerization, mass polymerization, and ultraviolet irradiation. The solution polymerization is preferable in view of cost and mass production. In the polymerization of the acrylic polymer, known components such as a polymerization initiator, a chain transfer agent, an emulsifier, and a solvent that are proper in the polymerization can be used.

Azo initiators are preferred as polymerization initiators used in the polymerization of the acrylic polymer through the solution polymerization. Examples of the azo initiators include 2,2'-azobisisobutyronitrile (hereinafter, AIBN), 2,2'-azobis-2-methylbutyronitrile (hereinafter, AMBN), dimethyl 2,2'-azobis(2-methylpropionate), and 4,4'-azobis-4-cyanovalerianic acid. The amount of the azo initiators is 0.05 to 0.5 parts by mass, more preferably 0.1 to 0.3 parts by mass, based on the total amount of the monomer component (100 parts by mass).

Solvents used in the polymerization of the acrylic polymer through the solution polymerization can be known organic solvents. Examples of the solvents include: ester solvents such as ethyl acetate and methyl acetate; ketone solvents such as acetone and methyl ethyl ketone; alcohol solvents such as methanol, ethanol, and butanol; hydrocarbon solvents such as cyclohexane, hexane, and heptane; aromatic solvents such as toluene and xylene. The organic solvents can be used alone or in combination of two or more kinds.

The weight-average molecular weight of the acrylic polymers is preferably 300,000 to 2,000,000, more preferably 600,000 to 1,500,000, and more preferably 700,000 to 1,500,000. The acrylic polymer having the weight-average molecular weight in the above range can exhibit proper adhesiveness and coating properties. The above weight-average molecular weight can be controlled by types and amounts of polymerization initiators, the temperature and duration of polymerization process, and further the monomer concentration and the dropwise addition rate of monomers.

The crosslinking agent is included in the acrylic adhesive to control the gel fraction (ratio of solvent-insoluble components) of the pressure-sensitive adhesive layer. Examples of the cross-linking agents include isocyanate cross-linking agents, epoxy crosslinking agents, melamine crosslinking agents, peroxide cross-linking agents, urea crosslinking agents, metal alkoxide crosslinking agents, metal chelate crosslinking agents, metal salt crosslinking agents, carbodiimide crosslinking agents, oxazoline crosslinking agents, aziridine crosslinking agents, and amine crosslinking agents. The isocyanate crosslinking agents are preferred as essential crosslinking agents, and are more preferably used in together with the epoxy cross-linking agents. The crosslinking agents can be used alone or in a combination of two or more kinds.

Examples of the isocyanate crosslinking agents include: lower aliphatic polyisocyanates such as 1,2-ethylene diisocyanate, 1,4-butylene diisocyanate, and 1,6-hexamethylene diisocyanate; alicyclic polyisocyanates such as cyclopentylene diisocyanate, cyclohexylene diisocyanate, isophorone diisocyanate, hydrogenated tolylene diisocyanate, hydrogenated xylene diisocyanate, and hydrogenated xylylene diisocyanate; aromatic polyisocyanates such as 2,4-tolylene diisocyanate, 2-6-tolylen diisocyanate, 4,4'-diphenylmethane diisocyanate, and xylylene diisocyanate. In addition to the above, examples of the isocyanate crosslinking agent include trimethylolpropane/tolylene diisocyanate adduct (available from Nippon Polyurethane Industry Co., Ltd. under the trade name CORONATE L,) and trimethylolpropane/hexamethylene diisocyanate adduct (available from Nippon Polyurethane Industry Co., Ltd. under the trade name CORONATE HL).

Examples of the epoxy cross-linking agents include: N,N,N',N'-tetraglycidyl-m-xylene diamine, diglycidylaniline, 1,3-bis(N,N-glycidylaminomethyl)cyclohexane, 1,6-hexanediol glycidyl ether, neopentyl glycol diglycidyl ether, ethylene glycol ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, adipic acid diglycidyl ester, o-phthalic acid diglycidyl ester, triglycidyl-tris(2-hydroxyethyl)isocyanurate, resorcin diglycidyl ether, and bisphenol-S-diglycidyl ether. In addition to the above, examples of the epoxy cross-linking agents include epoxy resins each having two or more epoxy groups per molecule.

The amount of the cross-linking agents in the adhesive is preferably within a range of 0.15 to 1.05 parts by mass, more preferably 0.2 to 1.05 parts by mass, and further more preferably 0.2 to 0.5 parts by mass, based on 100 parts by mass of the acrylic polymer.

The amount of the isocyanate cross-linking agents is preferably within a range of 0.15 to 1 part by mass, more preferably 0.2 to 1 part by mass, and further more preferably 0.2 to 0.5 parts by mass, based on 100 parts by mass of the acrylic polymer.

Since most of isocyanate crosslinking agents undergo crosslinking by themselves, isocyanate crosslinking agents may not sufficiently help to control the gel fraction if contained in a relatively low content. In this case, epoxy crosslinking agents are preferably used in combination. The content of epoxy crosslinking agents is preferably more than 0 to 0.05 parts by mass or less, and more preferably more than 0 to 0.02 parts by mass or less.

In addition to the above components, the acrylic adhesive may include known additives as necessary as long as the object of the present invention can be achieved. Examples of the additives includes age inhibitors, fillers, colorants (such as pigments and dyes), ultraviolet ray absorbing agents, antioxidants, plasticizing agents, softeners, surfactants, and antistatic agents.

The method of forming the pressure-sensitive adhesive layer 3 of the pressure-sensitive adhesive sheet 1 according to this embodiment is not particularly limited. The method may be any known method of forming a pressure-sensitive adhesive layer. An example of the method includes applying the above-described adhesive (or adhesive solution) on a predetermined surface (a surface of the second plastic film layer B of the base 2, for example) such that a dried adhesive has a predetermined thickness. Then, the adhesive is dried or cured as necessary (a direct application technique). Another example of the method includes applying the adhesive (or the adhesive solution) on a release linear such that a dried adhesive has a predetermined thickness. Then, the adhesive is dried or cured as necessary to obtain the pressure-sensitive adhesive layer 3, and the pressure-sensitive adhesive layer 3 is transferred on the predetermined surface (the surface of the second plastic film layer B of the base 2, for example)(a transfer technique). The adhesive (or the adhesive solution) may be applied by a known coater such as a gravure coater, a reverse coater, a kiss roll coater, a dip roll coater, a bar coater, a knife coater, and a spray coater.

Although the thickness of the pressure-sensitive adhesive layer 3 is not particularly limited, the pressure-sensitive adhesive layer 3 preferably has a thickness of 5 μm to 50 μm, more preferably 10 μm to 45 μm, and further more preferably 10 μm to 40 μm. The pressure-sensitive adhesive sheet 1 including the pressure-sensitive adhesive layer 3 having the thickness in the above range can have proper adhesion to an object without having a larger thickness. In addition, moisture or siloxane compound such as cyclic siloxane is less likely to pass through the pressure-sensitive adhesive sheet 1. The pressure-sensitive adhesive layer 3 may have a single layer or may be composed of multiple layers.

(Release Liner 4)

In the pressure-sensitive adhesive sheet 1 before use, a surface (an adhesive surface) of the pressure-sensitive adhesive layer 3 is protected by a release liner 4. The release liner 4 may be one selected from known release liners. A non-silicone release liner, which does not include silicone release agent, is used when the pressure-sensitive adhesive sheet 1 is attached to a hard disk drive (the magnetic disk drive). If a silicone release liner is used, a siloxane compound (siloxane gas) such as cyclic siloxane, which may damage the hard disk drive, is likely to be generated. The pressure-sensitive adhesive sheet 1 of this embodiment preferably includes the non-silicone release liner such that the siloxane compound such as the cyclic siloxane is less likely to be generated.

Any non-silicone release liner that does not include a silicone release agent can be used. Examples of the non-silicone release liner include a base member including a release layer such as a plastic film and a sheet subjected to a surface treatment using a release agent such as long-chain alkyl, fluorine, molybdenum sulfide release agents; a low-adhesive base member including fluorinated polymers such as polytetrafluoroethylene, polychlorotrifuruoroethylene, polyvinyl fluoride, polyvinylidene fluoride, tetrafluoroethylene hexafluoropropylene copolymers, chlorofluoroethylene vinylidene fluoride copolymers; and a low-adhesive base member including non-polar polymers such as olefin resins (e.g., polyethylene, polypropylene). The release liner (polyolefin release liner) including a film layer made of olefin resin on a release treatment surface side is preferred. The release liner (polyethylene release liner) including a film layer made of polyethylene on the release treatment surface side is more preferred. The polyolefin release liner may be a multilayer film of a polyester resin and a polyolefin resin as long as the polyolefin resin provides the surface to be in contact with the adhesive surface.

(Properties of the Pressure-Sensitive Adhesive Sheet 1)

The pressure-sensitive adhesive sheet 1 of this embodiment hardly has wrinkles when the pressure-sensitive adhesive sheet 1 is attached to an object. In addition, the pressure-sensitive adhesive sheet 1 hardly allows moisture to pass therethrough (moisture permeation suppression) and hardly allows siloxane compound such as cyclic siloxane to pass therethrough (siloxane permeation suppression). The moisture permeation suppression and siloxane permeation suppression of the pressure-sensitive adhesive sheet 1 of this embodiment may be mainly based on the configuration of the pressure-sensitive adhesive layer 3. The moisture and the foreign substance such as the siloxane compound are considered to travel inside the pressure-sensitive adhesive layer 3, not in the thickness direction of the pressure-sensitive adhesive sheet 1 (the base 2).

The pressure-sensitive adhesive sheet 1 has followability to uneven surface of the object (followability to difference in level). The pressure-sensitive adhesive sheet 1 also has properties such as rigidity, workability (handleability), preservation stability, and endurance.

The pressure-sensitive adhesive sheet 1 of this embodiment preferably has a deflection amount (as a result of a deflection test which will be described later) of less than 10 mm, more preferably less than 8 mm, further more preferably less than 5 mm, and particularly preferably less than 3 mm. The pressure-sensitive adhesive sheet 1 that has the deflection amount within this range is less likely to be deformed (for example, the pressure-sensitive adhesive sheet 1 is less likely to be curled) when the release liner 4 is detached from the pressure-sensitive adhesive layer 3.

(Application of the Pressure-Sensitive Adhesive Sheet 1)

Figure 2:
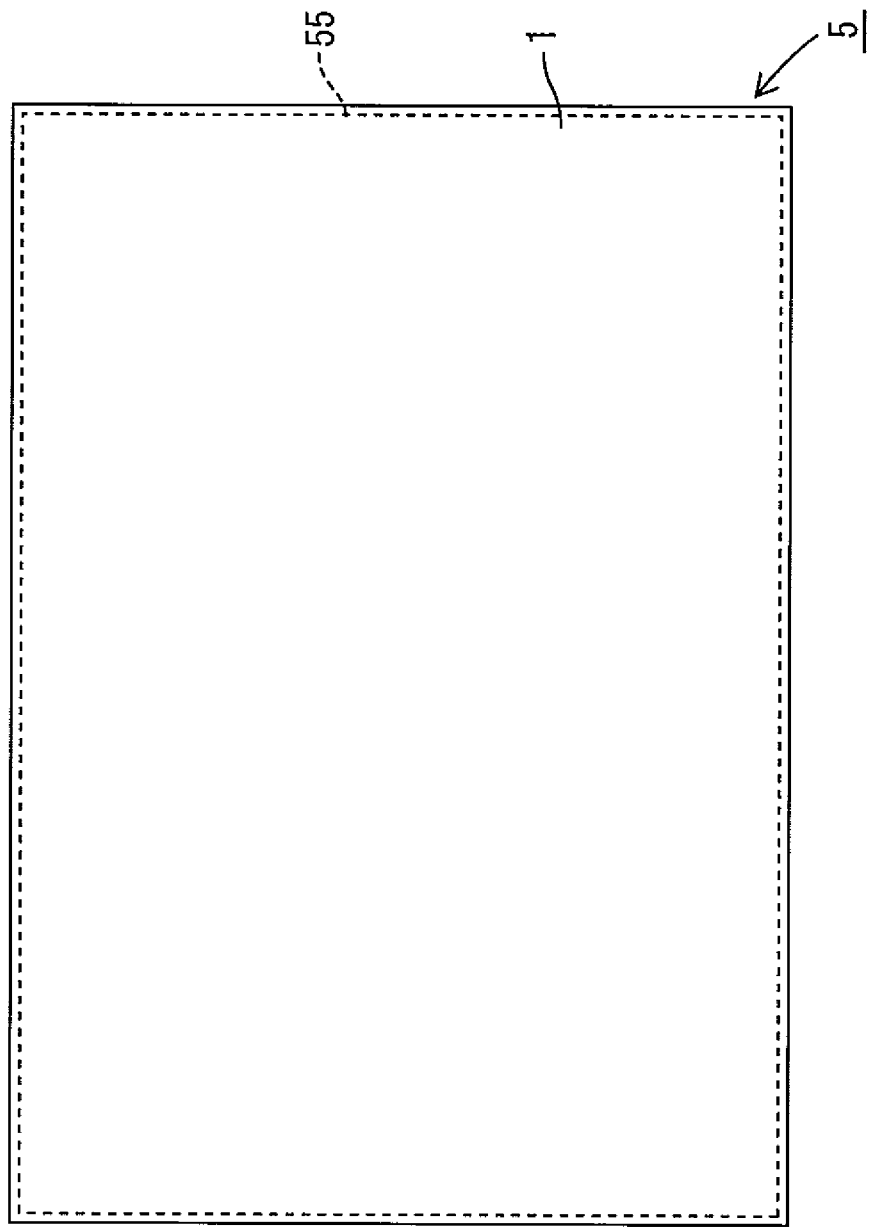
FIG. 2 is a top view of a hard disk drive. The pressure-sensitive adhesive sheet is attached to an upper surface of the hard disk drive.
Figure 3:
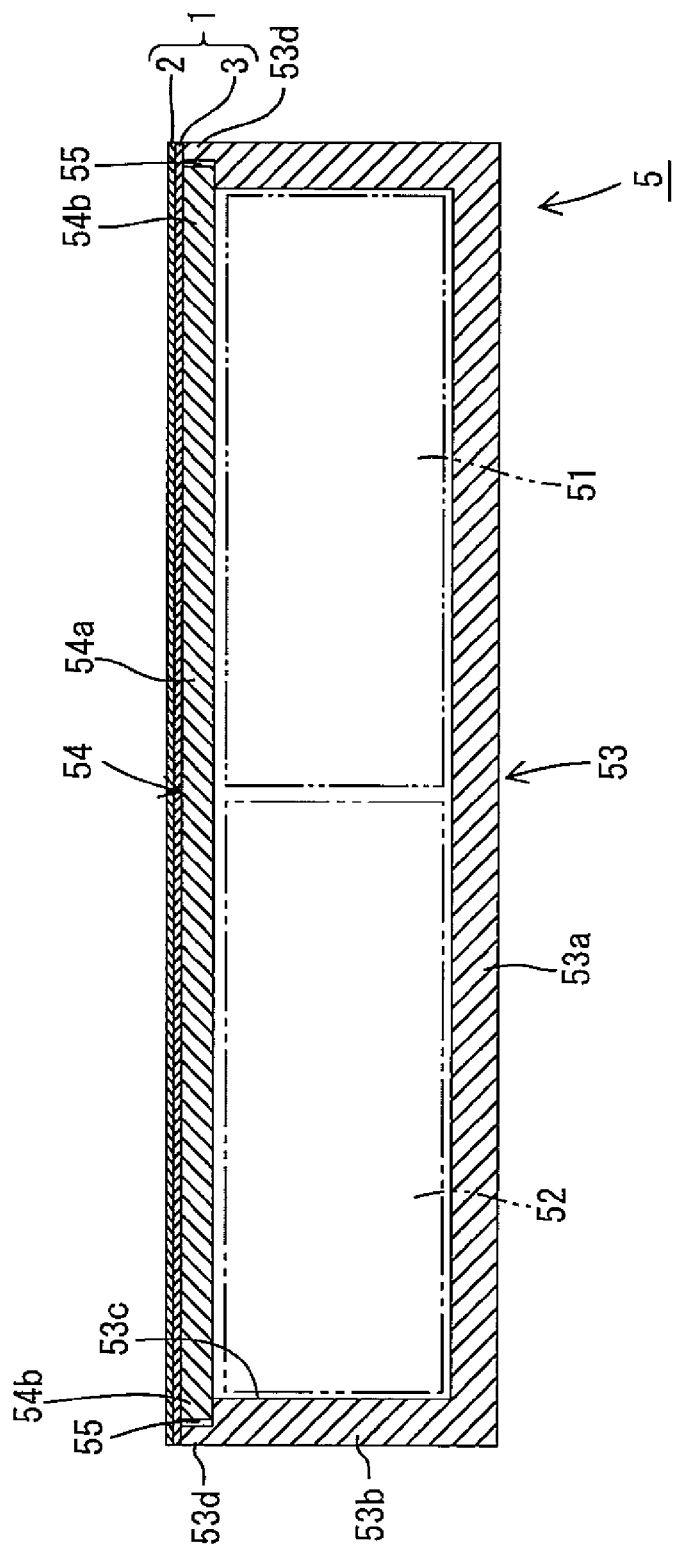
FIG. 3 is a schematic cross-sectional view of the hard disk drive.

The pressure-sensitive adhesive sheet 1 of this embodiment is used as a cover seal that is attached to the hard disk drive 5 to provide the air tightness to the hard disk drive (the magnetic disk drive) 5. A top view of the hard disk drive 5 on which the pressure-sensitive adhesive sheet 1 is attached is illustrated in FIG. 2. A cross-sectional view of a configuration of the hard disk drive 5 is schematically illustrated in FIG. 3. As illustrated in FIG. 2, the pressure-sensitive adhesive sheet 1 has a rectangular shape (an elongated shape) and is attached to the hard disk drive 5 to cover an upper surface of the hard disk drive 5. The configuration of the hard disk drive 5 will be described with reference to FIG. 2 and FIG. 3.

As illustrated in FIG. 3, the hard disk drive 5 includes a base member 53 and a cover 54. The base member 53 has a box-like shape and houses a magnetic disk unit 51 including a magnetic disk and a spindle motor and a head unit 52 including a magnetic head that configured to read or write information from or on the magnetic disk. The cover (a top cover) 54 is attached to the base member 53. The base member 53 is made of metal material such as SUS defined in JIS and has an open topped box like shape as a whole. Specifically, the base member 53 includes a bottom plate 53a and a peripheral wall 53b that extend in a vertical direction from a periphery of the bottom plate 53a. The base member 53 houses the magnetic disk unit 51 and the head unit 52 in a space defined by the bottom plate 53a and the peripheral wall 53b. The peripheral wall 53b includes an end portion (hereinafter, a frame-like end portion) 53d having a frame-like shape and extending along an opening 53c. The frame-like end portion 53d has a smaller width or thickness than other sections of the peripheral wall 53b such that an inner peripheral edge of the frame-like end portion 53d is located outward of an inner peripheral edge of the other sections of the peripheral wall 53b.

The cover 54 has a plate-like shape as a whole and is made of metal material such as SUS. The cover 54 includes a body 54a having a rectangular plate-like shape in a plan view. The cover 54 is attached to the base member 53 such that a peripheral edge (outer peripheral edge) of an end portion 54b included in the body 54a (the cover 54) faces the inner peripheral edge of the frame-like end portion 53b. The cover 54 covers the opening 53c of the base member 53 like a drop lid. Specifically, the cover 54 is smaller than an area defined by the inner peripheral edge of the frame-like end portion 53b, but larger than an area defined by the inner peripheral edge of the other section of the frame-like end portion 53b, and thus a small gap 55 is provided between the inner peripheral edge of the frame-like end portion 53d and the outer peripheral edge of the cover 54. In this embodiment, an upper surface of the frame-like end portion 53d and an upper surface of the cover 54 are flush with each other. According to other embodiments, the upper surface of the cover 54 may be a concave-convex surface. According to other embodiments, the upper surface of the frame-like end portion 53d and the upper surface of the end portion 54b of the cover 54 may not be flush with each other.

The pressure-sensitive adhesive sheet 1 of this embodiment is attached to the hard disk drive 5 such that the adhesive surface thereof covers an entire upper surface of the cover 54 (the body 54a) and an upper surface of the frame-like end portion 53d. The gap 55 provided between the inner peripheral edge of the frame-like end portion 53d and the outer peripheral edge of the cover 54 is covered by the end portion (a peripheral portion) of the pressure-sensitive adhesive sheet 1. The pressure-sensitive adhesive sheet 1 is attached to both of the frame-like end portion 53d and the cover 54 (the end portion 54b) so as to cover the gap 55 provided between the inner peripheral edge of the frame-like end portion 53d and the outer peripheral edge of the cover 54.

The cover 54 includes holes (openings) for installing components or writing data, for example. The holes are not illustrated in drawings. The holes are collectively covered by the pressure-sensitive adhesive sheet 1.

Figure 4:
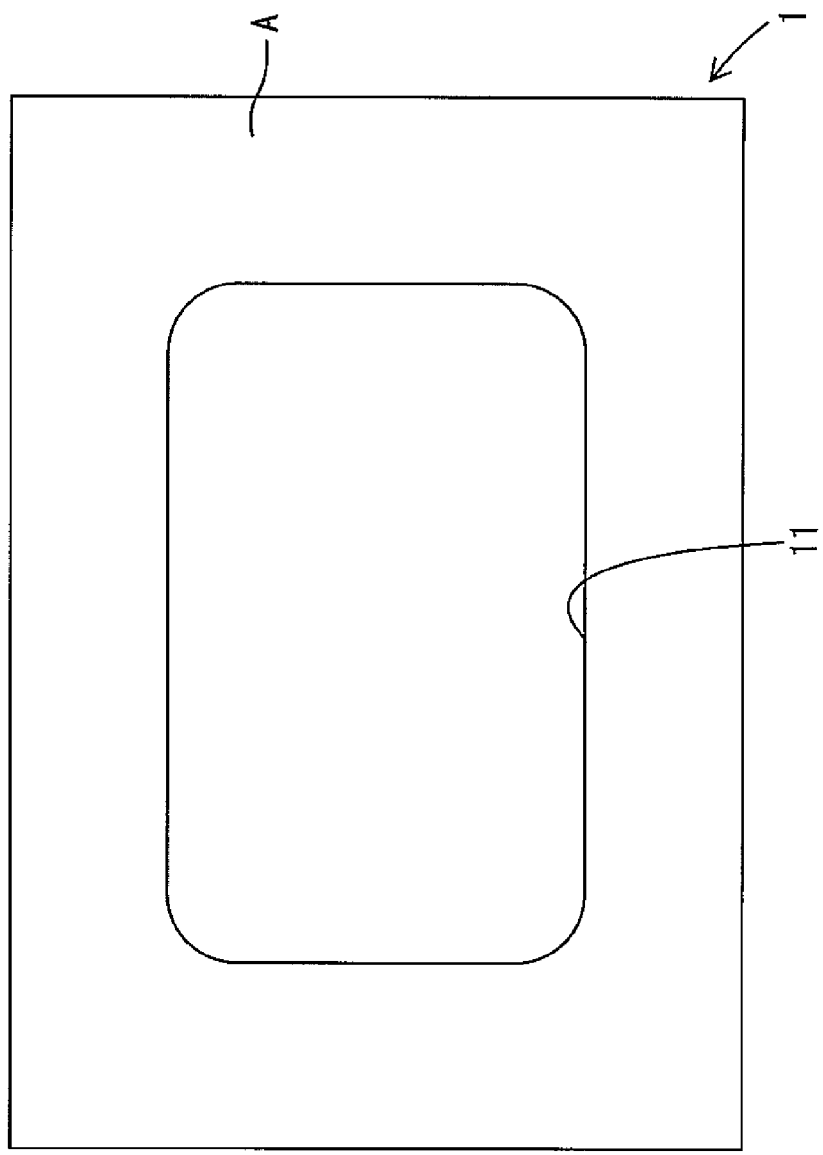
FIG. 4 is a top view of the pressure-sensitive adhesive sheet having an opening at its middle.

A top view of the pressure-sensitive adhesive sheet 1 that has an opening 11 at its middle is illustrated in FIG. 4. As illustrated in FIG. 4, the pressure-sensitive adhesive sheet 1 of this embodiment may have the opening 11 at its middle. The pressure-sensitive adhesive sheet 1 may have a frame-like shape (a loop shape, a ring shape) in a plan view. The pressure-sensitive adhesive sheet 1 having the frame-like shape may be attached to the hard disk drive 5 so as to cover the gap 55 illustrated in FIG. 2 and FIG. 3 and provide the air tightness to the hard disk drive 5.

In the frame-like shaped pressure-sensitive adhesive sheet 1 having the opening 11 at its middle as illustrated in FIG. 4, a ratio (%) of an area of the opening 11 to a total area of the pressure-sensitive adhesive sheet 1 (without the opening 11) is not particularly limited, but is preferably 80% or less, more preferably 70% or less, and further more preferably 50% or less. The pressure-sensitive adhesive sheet 1 that has the opening 11 in the ratio of 80% or less hardly has wrinkles when the pressure-sensitive adhesive sheet 1 is attached to an object (the hard disk drive 5).

The pressure-sensitive adhesive sheet 1 of this embodiment is not only used as the above-described cover seal, but may also be shaped into a predetermined shape and used to cover various holes (openings) of the cover 54 of the hard disk drive 5.

The pressure-sensitive adhesive sheet 1 of this embodiment can be attached to an object having a flat surface or an object having an concave-convex surface.

EXAMPLES

Hereinafter, the present invention will be described based on examples. The present invention is not limited to the examples.

Example 1

Production of a Base (a)

A base (a) having a three-layer structure was produced by a dry laminating method. The base (a) sequentially includes a first PET film that has a thickness of 25 μm, an aluminum layer that has a thickness of 7 μm, and a second PET layer that has a thickness of 9 μm from the front side. The produced base (a) had a total thickness of 46 μm.

(Preparation of Adhesive Composition Solution)

Solution polymerization of 93 parts by mass of butyl acrylate, 7 parts by mass of acrylic acid, and 0.05 parts by mass of 4-hydroxybutyl acrylate were carried out according to a common procedure in ethyl acetate, which is a solvent, in the presence of 0.1 part by mass of azobisisobutyronitrile, which is an initiator. Thus, a solution (solid concentration of 25% by mass) of an acrylic polymer having a weight-average molecular weight of 1,500,000 was prepared. To the solution, 0.4 parts by mass (in terms of solids content) of the isocyanate cros slinking agent (available from Nippon Polyurethane Industry Co., Ltd. under the trade name CORONATE L, tolylene diisocyanate adduct of trimethylolpropane with a solids concentration of 75% by mass) was added based on 100 parts by mass of the acrylic polymer, and thus an adhesive composition solution was obtained.

(Production of Pressure-Sensitive Adhesive Sheet)

The adhesive composition solution was applied onto the second PET film layer on the rear side of the base (a) such that the dried adhesive composition solution has a thickness of 25 μm. Then, the adhesive composition solution was dried at 120° C. for three minutes to obtain a pressure-sensitive adhesive layer on the base (a). Then, a release liner (available from Sun A. Kaken Co., Ltd. under the trade name SFL-70T2, 70 μm) that is made of a release processed and embossing processed thermoplastic film is attached to a surface of the pressure-sensitive adhesive layer, and thus the pressure-sensitive adhesive sheet with a release liner of Example 1 was obtained.

Example 2

A base (b) having a three-layer structure was produced in the same manner as Example 1, except that the thickness of the first PET film layer on the front side was changed to 38 μm. The total thickness of the produced base (b) was 59 μm. The adhesive composition solution that is the same one as used in Example 1 was applied onto the second PET film layer on the rear side of the base (b) such that the dried adhesive composition solution has a thickness of 25 μm. Then, the adhesive composition solution was dried at 120° C. for three minutes to obtain a pressure-sensitive adhesive layer on the base (b). In addition, the release liner same as one in Example 1 was attached to a surface of the pressure-sensitive adhesive layer, and thus the pressure-sensitive adhesive sheet with the release liner of Example 2 was obtained.

Example 3

A base (c) having a three-layer structure was produced in the same manner as Example 1, except that the thickness of the first PET film layer on the front side was changed to 50 μm. The total thickness of the produced base (c) was 71 μm. The adhesive composition solution that is the same one as used in Example 1 was applied onto the second PET film layer on the rear side of the base (c) such that the dried solution has a thickness of 25 μm. Then, the adhesive composition solution was dried at 120° C. for three minutes to obtain a pressure-sensitive adhesive layer on the base (c). In addition, the release liner same as one in Example 1 was attached to a surface of the pressure-sensitive adhesive layer, and thus the pressure-sensitive adhesive sheet with the release liner of Example 3 was obtained.

Example 4

A pressure-sensitive adhesive sheet with a release liner of Example 4 was produced in the same manner as Example 1, except that a pressure-sensitive adhesive layer was formed to have a thickness of 15 μm.

Example 5

A pressure-sensitive adhesive sheet with a release liner of Example 5 was produced in the same manner as Example 1, except that a pressure-sensitive adhesive layer was formed to have a thickness of 20 μm.

Example 6

A pressure-sensitive adhesive sheet with a release liner of Example 6 was produced in the same manner as Example 1, except that a pressure-sensitive adhesive layer was formed to have a thickness of 30 μm.

Example 7

A pressure-sensitive adhesive sheet with a release liner of Example 7 was produced in the same manner as Example 1, except that a pressure-sensitive adhesive layer was formed to have a thickness of 35 μm.

Comparative Example 1

A base (d) having a three-layer structure was produced in the same manner as Example 1, except that the thickness of the first PET film layer on the front side was changed to 9 μm. The total thickness of the produced base (d) was 30 μm. The adhesive composition solution that is the same one as used in Example 1 was applied onto the second PET film layer on the rear side of the base (d) such that the dried adhesive composition solution has a thickness of 25 μm. Then, the adhesive composition solution was dried at 120° C. for three minutes to obtain a pressure-sensitive adhesive layer on the base (d). In addition, the release liner same as one in Example 1 was attached to a surface of the pressure-sensitive adhesive layer, and thus the pressure-sensitive adhesive sheet with the release liner of Comparative Example 1 was obtained.

Comparative Example 2

A base (e) having a three-layer structure was produced in the same manner as Comparative Example 1, except that the thickness of the aluminum layer was changed to 9 μm. The total thickness of the produced base (e) was 32 μm. A pressure-sensitive adhesive sheet with a release liner of Comparative Example 2 was produced in the same manner as Comparative Example 1, except that the base (e) was used instead of the base (d).

Comparative Example 3

A base (f) having a three-layer structure was produced in the same manner as Comparative Example 1, except that the thickness of the aluminum layer was changed to 12 μm. The total thickness of the produced base (f) was 35 μm. A pressure-sensitive adhesive sheet with a release liner of Comparative Example 3 was produced in the same manner as Comparative Example 1, except that the base (f) was used instead of the base (d).

Comparative Example 4

A base (g) having a three-layer structure was produced in the same manner as Comparative Example 1, except that the thickness of the aluminum layer was changed to 15 μm. The total thickness of the produced base (g) was 38 μm. A pressure-sensitive adhesive sheet with a release liner of Comparative Example 4 was produced in the same manner as Comparative Example 1, except that the base (g) was used instead of the base (d).

Comparative Example 5

A base (h) having a three-layer structure was produced in the same manner as Comparative Example 1, except that the thickness of the aluminum layer was changed to 20 μm. The total thickness of the produced base (h) was 43 μm. A pressure-sensitive adhesive sheet with a release liner of Comparative Example 5 was produced in the same manner as Comparative Example 1, except that the base (h) was used instead of the base (d).

Comparative Example 6

A base (i) having a three-layer structure was produced in the same manner as Comparative Example 1, except that the thickness of the aluminum layer was changed to 25 μm. The total thickness of the produced base (i) was 48 μm. A pressure-sensitive adhesive sheet with a release liner of Comparative Example 6 was produced in the same manner as Comparative Example 1, except that the base (i) was used instead of the base (d).

Comparative Example 7

A base (j) having a three-layer structure was produced in the same manner as Comparative Example 1, except that the thickness of the aluminum layer was changed to 30 μm. The total thickness of the produced base (j) was 53 μm. A pressure-sensitive adhesive sheet with a release liner of Comparative Example 7 was produced in the same manner as Comparative Example 1, except that the base (j) was used instead of the base (d).

Comparative Example 8

A base (k) having a three-layer structure was produced in the same manner as Comparative Example 1, except that the thickness of the first PET film layer on the front side was changed to 12 μm. The total thickness of the produced base (k) was 33 μm. A pressure-sensitive adhesive sheet with a release liner of Comparative Example 8 was produced in the same manner as Comparative Example 1, except that the base (k) was used instead of the base (d).

Comparative Example 9

A base (l) having a two-layer structure was produced by a dry laminating method. The base (l) sequentially includes a PET film that has a thickness of 50 μm and an aluminum layer that has a thickness of 7 μm from a front side. The produced base (l) had a total thickness of 60 μm. The adhesive composition solution was applied onto the aluminum layer on the rear side of the base (l) such that the dried adhesive composition solution has a thickness of 25 μm. Then, the adhesive composition solution was dried at 120° C. for three minutes to obtain a pressure-sensitive adhesive layer on the base (l). In addition, the release liner same as one in Example 1 was attached to a front surface of the pressure-sensitive adhesive layer, and thus a pressure-sensitive adhesive sheet with a release liner of Comparative Example 9 was obtained.

Comparative Example 10

A base (m) having a two-layer structure was produced in the same manner as Comparative Example 9, except that the thickness of the PET film layer was changed to 9 μm and the thickness of the aluminum layer was changed to 30 μm. The total thickness of the produced base (m) was 42 μm. A pressure-sensitive adhesive sheet with a release liner of Comparative Example 10 was produced in the same manner as Comparative Example 9, except that the base (m) was used instead of the base (l).

The PET film layers and the aluminum layers used in Examples 1 to 7 and Comparative Examples 1 to 10 are as follows.

PET Film Layers

The PET film layer that has a thickness of 9 μm is available from Mitsubishi Chemical Corporation, under the trade name DIAFOIL M110-9, the PET film layer that has a thickness of 12 μm is available from Toray Industries, Inc., under the trade name LUMIRROR S10, #12, the PET film layer that has a thickness of 25 μm is available from Toray Industries, Inc., under the trade name LUMIRROR S10, #25, the PET film layer that has a thickness of 38 μm is available from Toray Industries, Inc., under the trade name LUMIRROR S10, #38, and the PET film layer that has a thickness of 50 μm is available from Toray Industries, Inc. under the trade name LUMIRROR S10, #50.

Aluminum Layers

The aluminum layer that has a thickness of 7 μm is available from SUMIKEI ALUMINUM FOIL Co., Ltd., under the trade name BESPA (7 μm), the aluminum layer that has a thickness of 9 μm is available from SUMIKEI ALUMINUM FOIL Co., Ltd., under the trade name BESPA (9 μm), the aluminum layer that has a thickness of 12 μm is available from SUMIKEI ALUMINUM FOIL Co., Ltd., under the trade name BESPA (12 μm), the aluminum layer that has a thickness of 15 μm is available from SUMIKEI ALUMINUM FOIL Co., Ltd., under the trade name BESPA (15 μm), the aluminum layer that has a thickness of 20 μm is available from SUMIKEI ALUMINUM FOIL Co., Ltd., under the trade name BESPA (20 μm), the aluminum layer that has a thickness of 25 μm is available from SUMIKEI ALUMINUM FOIL Co., Ltd., under the trade name BESPA (25 μm), and the aluminum layer that has a thickness of 30 μm is available from SUMIKEI ALUMINUM FOIL Co., Ltd., under the trade name BESPA (30 μm).

Evaluation

The following evaluation tests were carried out on the pressure-sensitive adhesive sheets of Examples 1 to 7 and Comparative Examples of 1 to 10.

1. Moisture Permeability Test

Figure 5:
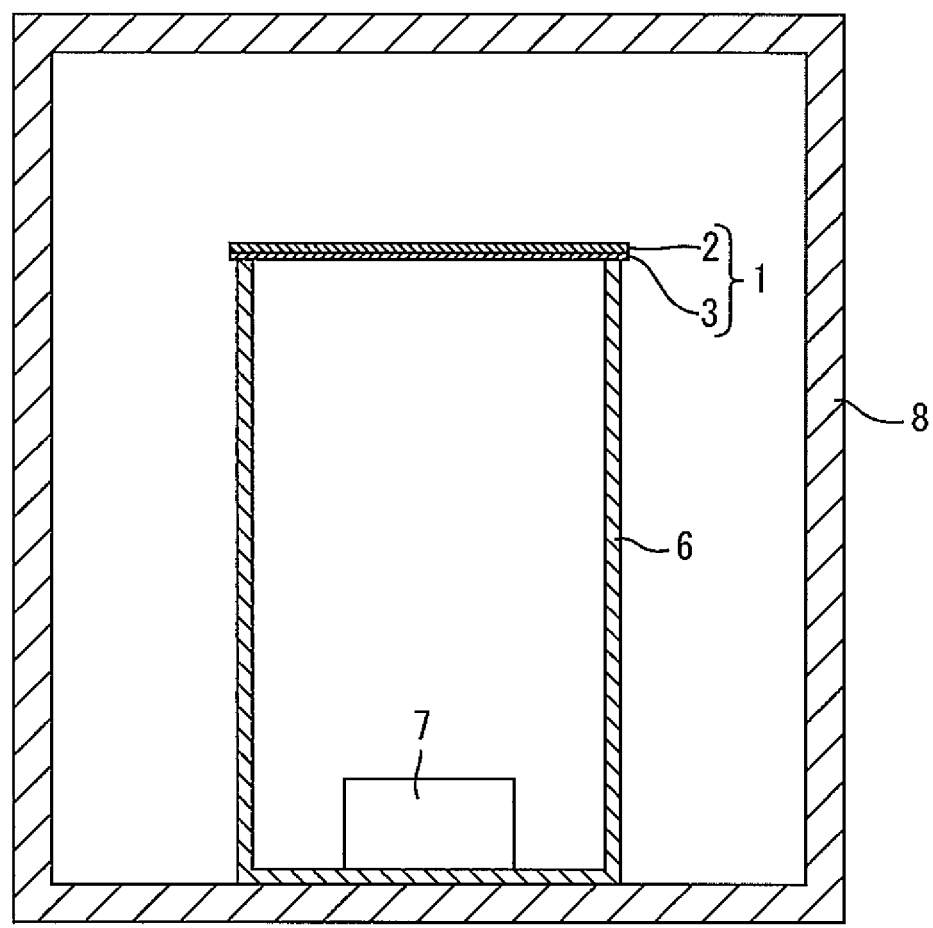
FIG. 5 is an explanation view schematically illustrating a content of moisture permeability test.

An explanation view of the moisture permeability test is schematically illustrated in FIG. 5. As illustrated in FIG. 5, a test cup 6 was provided. The test cup 6 is made of aluminum, has a diameter of 30 mm, and is one employed in Dish Method defined in JISZ0208.

The pressure-sensitive adhesive sheet 1 was cut into a circular shape having a diameter of 30 mm (circumference of about 94 mm) and provided as a test piece. The diameter of 30 mm corresponds to the diameter of the cup 6.

Next, a button type thermo-hygrometer 7 (a temperature and humidity data logger, available from KN laboratories, Inc. under the trade name HYGROCHRON) was placed inside the cup 6 at a temperature of 23° C. and a humidity of 41% RH. Then, the release liner was detached from the adhesive surface of the test piece, and the test piece of the pressure-sensitive adhesive sheet 1 was attached to an opening edge of the cup 6 at its adhesive surface so as to cover the opening of the test cup 6. The opening of the cup 6 was sealed by the test piece that covered the opening of the test cup 6. The opening edge of the cup 6 that is in contact with (to be attached to) the adhesive surface of the test piece had a width (an overlap width) of 2.0 mm.

The cup 6 sealed with the test piece was left stand in a constant temperature/humidity chamber 8 at a temperature of 60° C. and a humidity of 90% RH for five days. Then, the thermo-hygrometer 7 was removed from the cup 6 and the recorded data (humidity %) of the thermo-hygrometer 7 was read. The moisture permeability (moisture permeation suppression) of the test piece (the pressure-sensitive adhesive sheet 1) was evaluated based on the data that was read out (i.e., the data recorded on the fifth day after the test piece was left in the constant temperature/humidity chamber 8).

The results (humidity %) of the moisture permeability test of each pressure-sensitive adhesive sheet 1 (the test piece) in Examples and Comparative Examples are indicated in Table 1. The pressure-sensitive adhesive sheet 1 that shows a humidity of less than 70.0% was determined to have sufficient moisture suppression performance (humidity barrier).

2. Siloxane Permeability Test (SiD4 Test)

Figure 6:
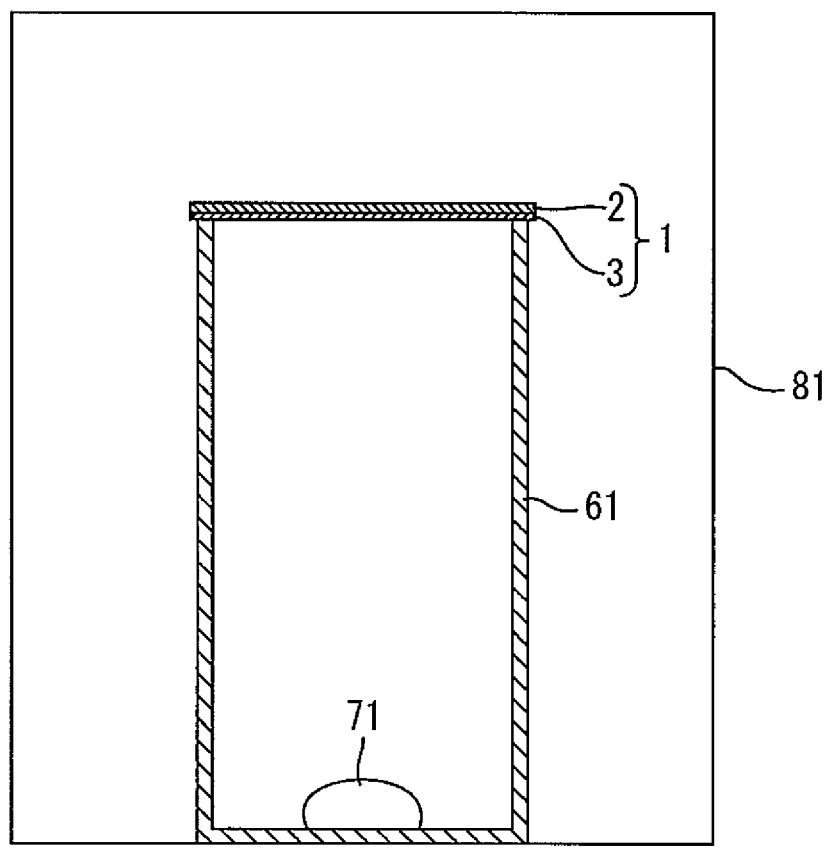
FIG. 6 is an explanation view schematically illustrating a content of SiD4 test.

An explanation view of SiD4 test is schematically illustrated in FIG. 6. As illustrated in FIG. 6, a vial 61 (capacity of 50 ml) was provided.

The pressure-sensitive adhesive sheet 1 was cut into a circular shape having a circumference of about 78 mm and provided as a test piece. The circumference corresponds to an opening diameter of the vial 7.

Then, 50 mg of octamethylcyclotetrasiloxane 71 (cyclic siloxane D4) was placed in the vial 61 at a temperature of 23° C. and a humidity of 50% RH. The completely volatilized 50 mg of the siloxane 71 corresponds to the concentration of 10,000 ppm in the vial 61.

Then, the release liner was detached from the adhesive surface of the test piece, and the test piece of the pressure-sensitive adhesive sheet 1 was attached to an opening edge of the vial 61 at its adhesive surface so as to cover the opening of the vial 61. The opening of the vial 61 was sealed by the test piece that covered the opening of the vial 61. The opening edge of the vial 61 that is in contact with the adhesive surface of the test piece had a width (an overlap width) of 1.5 mm.

The vial 61 sealed with the test piece was left stand at a temperature of 23° C. and a humidity of 50% RH for thirty minutes. Then, the vial 61 was placed in a gas sampling bag 81 (trade name "analytic barrier bag" which is the registered trademark) and heated at 65° C. for 72 hours.

Then, the amount of siloxane gas in the gas sampling bag 81 was determined by gas chromatography. Permeability (%) of the siloxane, which passes through the pressure-sensitive adhesive layer 3 of the test piece (the pressure-sensitive adhesive sheet 1), was obtained by using the determined amount. The siloxane permeability (siloxane permeation suppression) of the test piece (the pressure-sensitive adhesive sheet 1) was evaluated based on the permeability.

The siloxane permeability (%) of each adhesive sheet (the test piece) in Examples and Comparative Examples is indicated in Table 1. The pressure-sensitive adhesive sheet 1 that shows the siloxane permeability of less than 1.0% was determined to have sufficient siloxane permeation suppression (cyclic siloxane D4 barrier).

3. Deflection Test

Figure 7:
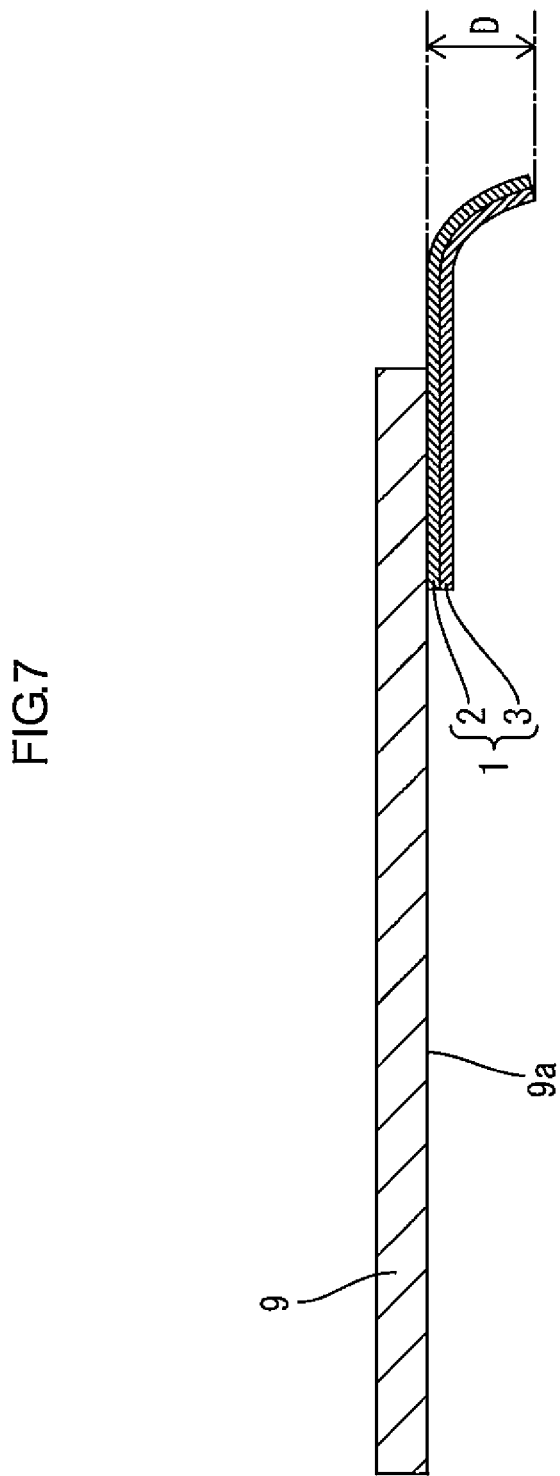
FIG. 7 is an explanation view schematically illustrating a content of a deflection testing.

An explanation view of a deflection test is schematically illustrated in FIG. 7. As illustrated in FIG. 7, a stainless (hereinafter, SUS) plate 9 is provided.

The pressure-sensitive adhesive sheet 1 was cut into a strip shape having a width of 10 mm and a length of 100 mm and provided as a test piece.

Then, the release liner was detached from the test piece having the strip shape. The test piece was attached to the SUS plate 9 such that a longitudinal end of the test piece extends outwardly from the SUS plate 9 by 50 mm. During the attachment of the test piece, a roller of 2 kg was reciprocated on the test piece to press the test piece against the SUS plate 9. After the test piece was attached to the SUS plate 9, they were left stand at a temperature of 23° C. for one minute.

Then, as illustrated in FIG. 7, the SUS plate 9 was fixed horizontally such that an attachment surface 9a on which the test piece was attached faces downward. The end of the test piece that extended outward from the SUS plate 9 was sagged under its own weight. A distance D of the sagged part of the test piece in a vertical direction was measured. The measured distance D was used as a deflection amount (mm) of the test piece (the pressure-sensitive adhesive sheet 1) to evaluate the rigidity of the test piece (the pressure-sensitive adhesive sheet 1).

The result of the deflection test (the deflection amount) of each adhesive sheet (the test piece) in Examples and Comparative Examples is indicated in Table 1. The pressure-sensitive adhesive sheet 1 that shows the deflection amount of less than 10 mm was determined to have sufficient rigidity as the pressure-sensitive adhesive sheet 1.

4. Wrinkle Test 1 (Flat Surface Attachment Test)

Figure 8:
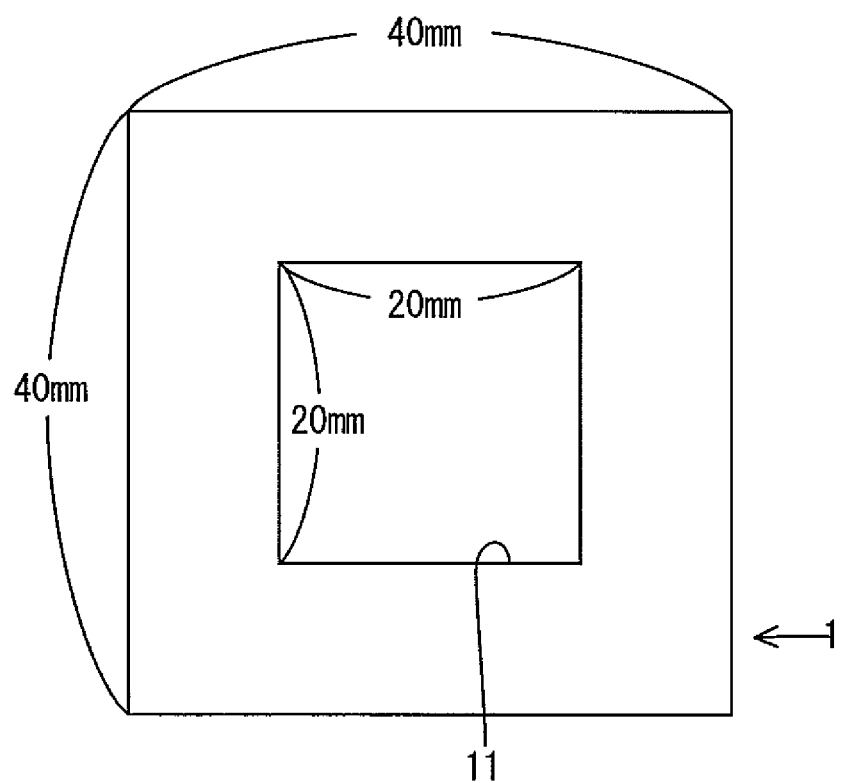
FIG. 8 is a plan view of a test piece of the pressure-sensitive adhesive sheet that will be used in a wrinkle test 1.

A top view of a test piece of the pressure-sensitive adhesive sheet 1 used in a wrinkle test 1 is illustrated in FIG. 8. As illustrated in FIG. 8, the test piece used in the wrinkle test 1 has a frame like shape having an opening 11 at its middle. The test piece was cut out of the pressure-sensitive adhesive sheet 1.

Outer sides of the test piece define a square 40 mm on a side. Inner sides of the test piece, which extends along the opening 11, define a square 20 mm on a side. The opening 11 was located away from the outer sides of the square toward the inner sides by 10 mm.

An aluminum plate 91 (A1050, thickness of 0.5 mm) having a flat surface was provided as an object to which the test piece was attached.

The release liner was detached from the adhesive surface of the test piece having a frame like shape, and then the unfolded test piece was attached to the aluminum plate 91 such that the adhesive surface of the test piece was in contact with the flat surface of the aluminum plate 91. During the attachment of the test piece, a roller of 2 kg was reciprocated on the test piece to press the test piece against the aluminum plate 91.

The test piece attached to the aluminum plate 91 was visually checked whether wrinkles were formed on the test piece. The test piece that did not have wrinkles was determined as "no wrinkles" and the test piece that had wrinkles was determined as "with wrinkles".

Figure 9:
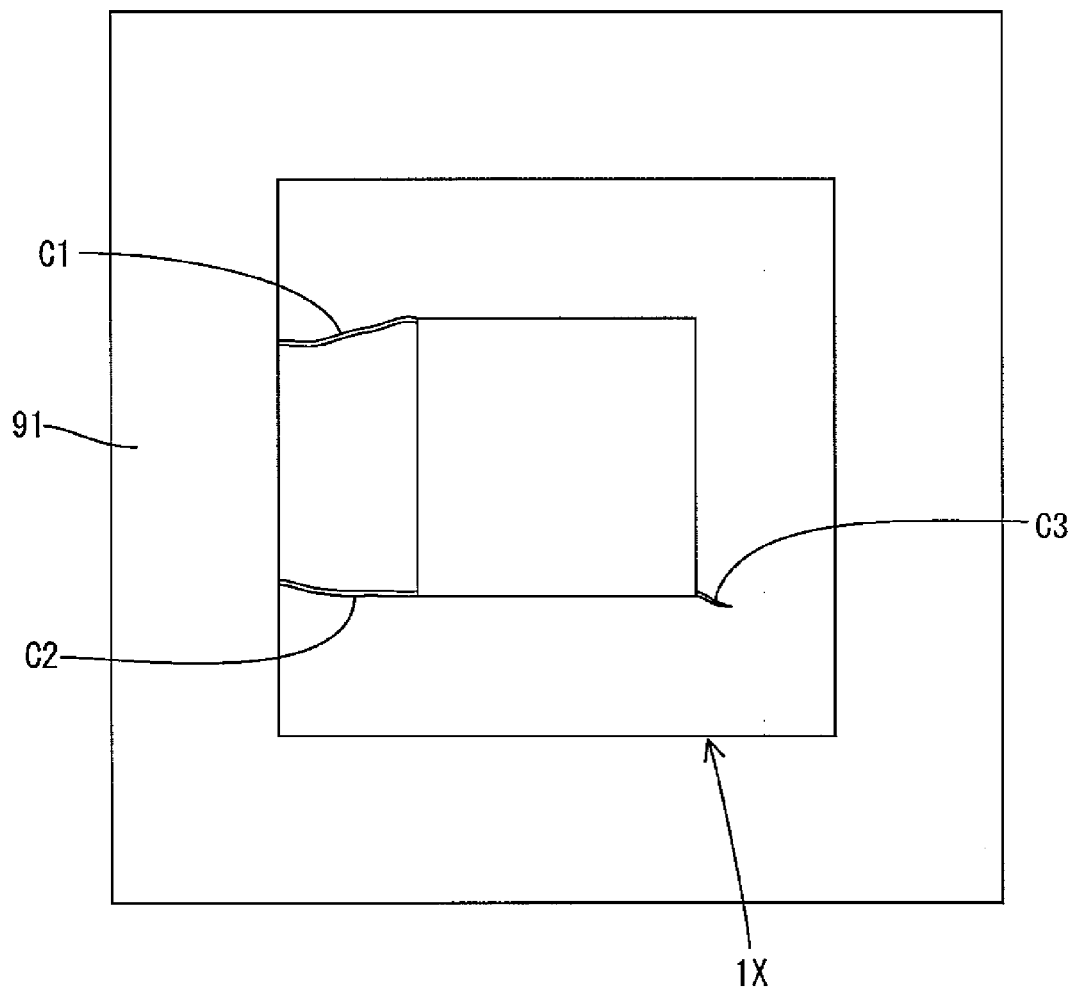
FIG. 9 is an explanation view schematically illustrating a test piece used in the wrinkle test 1. The test piece is attached to an aluminum plate.

An example of wrinkle that may be formed on a test piece 1X (a test piece of the pressure-sensitive adhesive sheet of each Comparative Example) will be described with reference to FIG. 9. An explanation view of the test piece 1 attached to the aluminum plate and having wrinkles is schematically illustrated in FIG. 9. The test piece 1X illustrated in FIG. 9 has three wrinkles C1, C2, and C3. The wrinkles C1 and C2 formed over an outer end portion of the test piece 1X are parts of the test piece 1X that were bent into a mountain-like shape. The wrinkles C1 and C2 extend between the outer end portion and an inner end portion of the test piece 1X. In addition to the wrinkles C1 and C2, the wrinkle C3 that is formed only at the inner end portion is illustrated in FIG. 9.

The pressure-sensitive adhesive sheet that had the wrinkle as illustrated in FIG. 9 was determined as "with wrinkles".

The above-described wrinkle determinations in which the pressure-sensitive adhesive sheet was determined as "no wrinkles" or "with wrinkles" were repeated 10 times for each adhesive sheet of Examples and Comparative Examples. Frequency of the wrinkles in each adhesive sheet was expressed in percentage. The frequency (%) is indicated in Table 1. The pressure-sensitive adhesive sheets that were determined as "with wrinkles" even one time out of ten were evaluated as "poor" as indicated in Table 1. The frequency of "with wrinkles" is also indicated in Table 1. The pressure-sensitive adhesive sheets that were determined as "no wrinkles" at every wrinkle determination were evaluated as "good".

5. Wrinkle Test 2 (in which the Pressure-Sensitive Adhesive Sheet is Attached to a Surface with a Square Protrusion)

The wrinkle test 2 was carried out only on the pressure-sensitive adhesive sheets that did not have wrinkles in the above wrinkle test 1 (i.e., the pressure-sensitive adhesive sheets of Examples 1 to 7).

In the wrinkle test 2, the pressure-sensitive adhesive sheet 1 was cut into a square 40 mm on a side and provided as a test piece. Unlike the test piece in the wrinkle test 1, the test piece used in the wrinkle test 2 does not have an opening at its middle.

Figure 10:
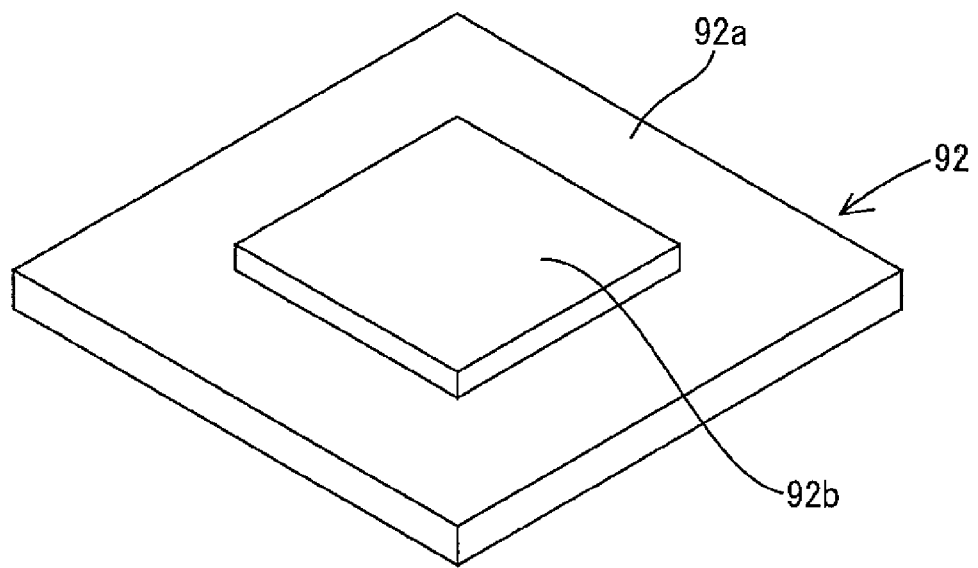
FIG. 10 is a perspective view of an object which is used in a wrinkle test 1 and to which the test piece is attached.
Figure 11:
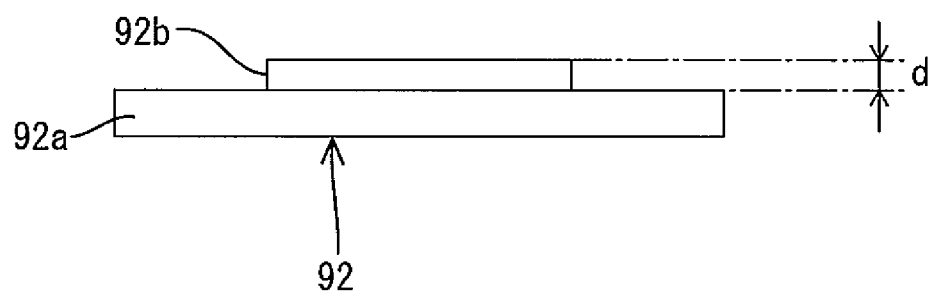
FIG. 11 is a side view of the object used in the wrinkle test 2.

As illustrated in FIG. 10 and FIG. 11, an object 92 to which the test piece is attached has a square protrusion on its middle.

A perspective view of the object 92 used in the wrinkle test 2 is illustrated in FIG. 10. A side view of the object 92 is illustrated in FIG. 11.

The object 92 used in the wrinkle test 2 was formed of an aluminum plate 92a (A1050) having a square shape 40 mm on a side and having a thickness ("d" in FIG. 11) of 500 μm and an aluminum plate 92b (A1050) having a square shape 20 mm on a side and having a thickness of 300 μm. The aluminum plate 92a and the aluminum plate 92b are hereinafter referred to as a large aluminum plate 92a and a small aluminum plate 92b, respectively. The small aluminum plate 92b is disposed on the large aluminum plate 92a. The small aluminum plate 92b that is a square 20 mm on a side was arranged on the middle of the large aluminum plate 92a that is a square 40 mm on a side.

Before the wrinkle test 2, the release liner was detached from the adhesive surface of the test piece. Then, the unfolded test piece was attached to the object 92 such that a middle portion of an adhesive surface of the test piece was in contact with the small aluminum plate 92b and a frame like portion of the adhesive surface, which surrounds the middle portion, was in contact with a protruded portion of the large aluminum plate 92a, which extends outward from the small aluminum plate 92b. During the attachment of the test piece, a roller of 2 kg was reciprocated on the test piece (the pressure-sensitive adhesive sheet 1) to press the test piece against the object 92.

The test piece attached to the object 92 was visually checked whether the test piece had wrinkles. If the test piece did not have wrinkles, the test piece was determined as "no wrinkles". If the test piece had wrinkles, the test piece was determined as "with wrinkles".

Figure 12:
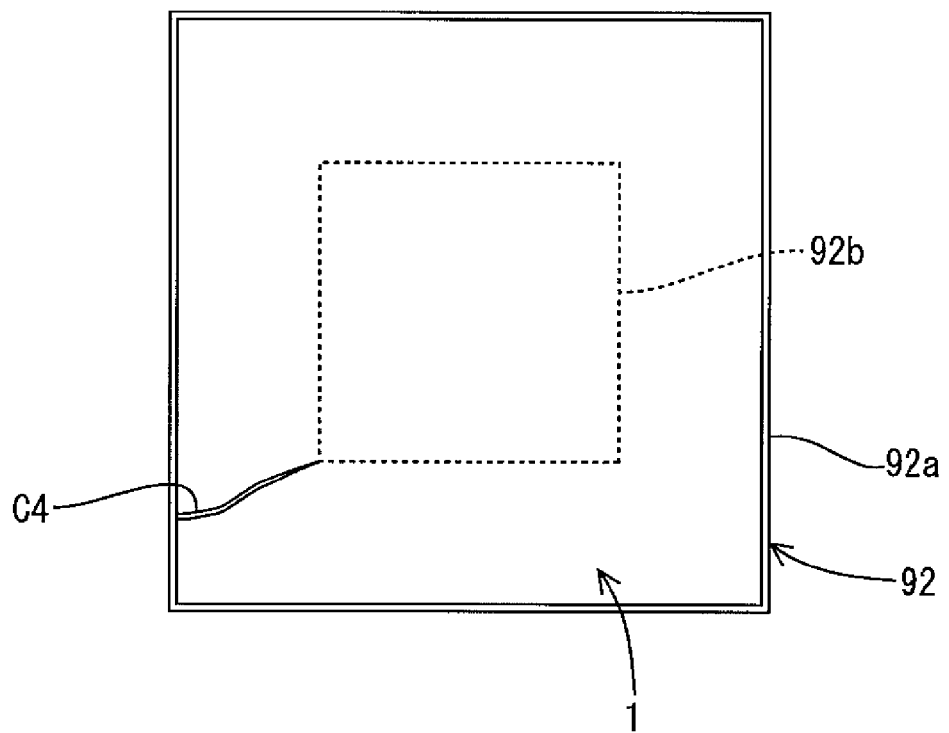
FIG. 12 is an explanation view schematically illustrating a test piece used in the wrinkle test 2. The test piece is attached to the object.

With reference to FIG. 12, an example of wrinkle that may be formed in the wrinkle determination test 2 is described. An explanation view of the test piece (the pressure-sensitive adhesive sheet 1) attached to the object 92 and having a wrinkle in the wrinkle determination test 2 is schematically illustrated in FIG. 12. The test piece illustrated in FIG. 12 has one wrinkle C4. The wrinkle C4 is a part of the test piece that was bent into a mountain-like shape. The wrinkle C4 extends between an outer end portion and an inner end portion of the test piece.

The pressure-sensitive adhesive sheet that had the wrinkle as illustrated in FIG. 12 was determined as "with wrinkles".

The above-described wrinkle determinations in which the pressure-sensitive adhesive sheet was determined as "no wrinkles" or "with wrinkles" were repeated 10 times for each adhesive sheet of Examples. Frequency of the wrinkles in each adhesive sheet was expressed in percentage. The frequency (%) is indicated in Table 1. The pressure-sensitive adhesive sheets that were determined as "with wrinkles" even one time out of ten were evaluated as "poor" as indicated in Table 1. The frequency of "with wrinkles" is also indicated in Table 1. The pressure-sensitive adhesive sheets that were determined as "no wrinkles" at every wrinkle determination were evaluated as "good". In Table 1, the pressure-sensitive adhesive sheets on which the wrinkle test 2 was not carried out were indicated by symbol "—".

TABLE 1

| | | | EXAMPLES | | | | | | | COMPARATIVE EXAMPLES | |
|---|---|---|---|---|---|---|---|---|---|---|---|
| | | | 1 | 2 | 3 | 4 | 5 | 6 | 7 | 1 | 2 |
| BASE | Ta | KIND | a | b | c | a | a | a | a | d | e |
| | | FIRST PET LAYER (A) (μm) | 25 | 38 | 50 | 25 | 25 | 25 | 25 | 9 | 9 |
| | | Al LAYER (μm) | 7 | 7 | 7 | 7 | 7 | 7 | 7 | 7 | 9 |
| | Tb | SECOND PET LAYER (B) (μm) | 9 | 9 | 9 | 9 | 9 | 9 | 9 | 9 | 9 |
| | | Ta + Tb (μm) | 34 | 47 | 59 | 34 | 34 | 34 | 34 | 18 | 18 |
| | | Ta/Tb | 2.78 | 4.22 | 5.56 | 2.78 | 2.78 | 2.78 | 2.78 | 1 | 1 |
| | | TOTAL THICKNESS (μm) | 46 | 59 | 71 | 46 | 46 | 46 | 46 | 30 | 32 |
| PRESSURE-SENSITIVE ADHESIVE LAYER | | COMPOSITION SOLUTION | I | I | I | I | I | I | I | I | I |
| | | THICKNESS (μm) | 25 | 25 | 25 | 15 | 20 | 30 | 35 | 25 | 25 |
| EVALUATION | 1 | MOISTURE PERMEABILITY TEST (%) | 52.5 | 53.4 | 53.2 | 63.0 | 60.0 | 56.5 | 69.0 | 76.3 | 74.6 |
| | 2 | SiD4 TEST (%) | 0.36 | 0.34 | 0.35 | 0.28 | 0.31 | 0.62 | 0.86 | 4.87 | 2.66 |
| | 3 | DEFLECTION TEST (mm) | 2 | 2 | 2 | 2 | 2 | 2 | 2 | 20 | 16 |
| | 4 | WRINKLE TEST 1 (%) | GOOD | GOOD | GOOD | GOOD | GOOD | GOOD | GOOD | POOR (90) | POOR (60) |
| | 5 | WRINKLE TEST 2 (%) | GOOD | POOR (10) | POOR (50) | GOOD | GOOD | GOOD | GOOD | — | — |

| | | | COMPARATIVE EXAMPLES | | | | | | | |
|---|---|---|---|---|---|---|---|---|---|---|
| | | | 3 | 4 | 5 | 6 | 7 | 8 | 9 | 10 |
| BASE | Ta | KIND | f | g | h | i | j | k | l | m |
| | | FIRST PET LAYER (A) (μm) | 9 | 9 | 9 | 9 | 9 | 12 | 50 | 9 |

TABLE 1-continued

|  |  |  |  |  |  |  |  |  |  |
|---|---|---|---|---|---|---|---|---|---|
|  |  | Al LAYER (μm) | 12 | 15 | 20 | 25 | 30 | 7 | 7 | 30 |
|  | Tb | SECOND PET LAYER (B) (μm) | 9 | 9 | 9 | 9 | 9 | 9 | 0 | 0 |
|  |  | Ta + Tb (μm) | 18 | 18 | 18 | 18 | 18 | 21 | 50 | 9 |
|  |  | Ta/Tb | 1 | 1 | 1 | 1 | 1 | 1.33 | — | — |
|  |  | TOTAL THICKNESS (μm) | 35 | 38 | 43 | 48 | 53 | 33 | 60 | 42 |
| PRESSURE-SENSITIVE ADHESIVE LAYER |  | COMPOSITION SOLUTION | I | I | I | I | I | I | I | I |
|  |  | THICKNESS (μm) | 25 | 25 | 25 | 25 | 25 | 25 | 25 | 25 |
| EVALUATION | 1 | MOISTURE PERMEABILITY TEST (%) | 70.3 | 58.2 | 53.2 | 53.4 | 54.1 | 72.6 | 75.0 | 79.6 |
|  | 2 | SiD4 TEST (%) | 1.36 | 0.65 | 0.36 | 0.36 | 0.36 | 2.36 | 9.46 | 10.14 |
|  | 3 | DEFLECTION TEST (mm) | 12 | 10 | 4 | 2 | 2 | 14 | 2 | 2 |
|  | 4 | WRINKLE TEST 1 (%) | POOR (30) | POOR (10) | POOR (10) | POOR (10) | POOR (10) | POOR (50) | POOR (30) | POOR (40) |
|  | 5 | WRINKLE TEST 2 (%) | — | — | — | — | — | — | — | — |

Results of Wrinkle Test 1

No wrinkles were found in the pressure-sensitive adhesive sheets of Examples 1 to 7 in the wrinkle test 1. In the pressure-sensitive adhesive sheets of Examples 1 to 7, the thickness Ta of the first PET film layer A on the front side of the base is larger than the thickness Tb of the second PET film layer B on the rear side. In the pressure-sensitive adhesive sheets of Examples 1 to 7, the aluminum layer has the thickness of 7 μm, which is in a range of 2 μm to 15 μm. In the pressure-sensitive adhesive sheets of Examples 1 to 7, a sum (total) of the thickness Ta of the first PET film layer A and the thickness Tb of the second PET film layer B is 34 μm to 59 μm.

Wrinkles were found in the pressure-sensitive adhesive sheets of Comparative Examples 1 to 10 in the wrinkle test 1.

Comparative Examples 1 to 4

Unlike Examples, the pressure-sensitive adhesive sheets of Comparative Examples 1 to 4 each had the deflection amount of 10 mm to 20 mm as a result of the deflection test, and thus the pressure-sensitive adhesive sheets were determined not to have sufficient rigidity. In Comparative Examples 1 to 4, the sum (total thickness) of the thickness Ta of the first PET film layer A and the thickness Tb of the second PET film layer B was 18 μm, which is smaller than those of Examples. Thus, in Comparative Examples 1 to 4, some of the pressure-sensitive adhesive sheets (the test pieces) were deformed, for example curled, when the release liner was detached from the pressure-sensitive adhesive layer. The deformed pressure-sensitive adhesive sheet had wrinkles when attached to the object 91.

Comparative Examples 5 to 7

The pressure-sensitive adhesive sheets of Comparative Examples 5 to 7 each had the deflection amount of 2 mm to 4 mm, and thus the pressure-sensitive adhesive sheets were determined to have sufficient rigidity. However, as described above, the pressure-sensitive adhesive sheets of Comparative Examples 5 to 7 had wrinkles in the wrinkle test 1. In the pressure-sensitive adhesive sheets of Comparative Examples 5 to 7, the total thickness of Ta and Tb of the base was 18 μm like Comparative Examples 1 to 4, but the thickness of the aluminum layer was larger than that in Examples, i.e., 20 μm to 30 μm. In Comparative Examples 5 to 7, the rigidity of the pressure-sensitive adhesive sheet (the base) may mainly be provided by the aluminum layer.

In Comparative Examples 5 to 7, the pressure-sensitive adhesive sheets were not deformed, e.g., curled, unlike Comparative Examples 1 to 4, when the release liner was detached from the pressure-sensitive adhesive layer. However, in the pressure-sensitive adhesive sheets of Comparative Examples 5 to 7, when the release liner was detached from the pressure-sensitive adhesive layer, deformation that is hard to be visually confirmed may occur. In the base that includes the aluminum layer having a large thickness, depending on how the release liner was detached (for example, the release liner was detached relatively fast from the pressure-sensitive adhesive layer), the aluminum layer included in the base may plastically be deformed to a point where the deformation causes wrinkles. Accordingly, when the pressure-sensitive adhesive sheet was attached to the object 91, the wrinkles were formed on the pressure-sensitive adhesive sheet.

Comparative Example 8

The pressure-sensitive adhesive sheet of Comparative Example 8 had the deflection amount of 14 mm as a result of the deflection test, and thus the pressure-sensitive adhesive sheet was determined not to have sufficient rigidity. In Comparative Example 8, the sum (total) of the thickness Ta of the first PET film layer A and the thickness Tb of the second PET film layer B was 21 μm, which is smaller than those of Examples. Thus, in Comparative Example 8, some of the pressure-sensitive adhesive sheets (the test pieces) were deformed, for example curled, when the release liner was detached from the pressure-sensitive adhesive layer. The curled adhesive sheet had wrinkles when attached to the object 91.

Comparative Example 9

The pressure-sensitive adhesive sheet of Comparative Example 9 had the deflection amount of 2 mm as a result of the deflection test, and thus the pressure-sensitive adhesive sheet was determined to have sufficient rigidity. However, the pressure-sensitive adhesive sheet of Comparative Example 9 did not include the second PET film layer B on the rear side of the base. The pressure-sensitive adhesive layer was formed on the aluminum layer. In Comparative Example 9, the rigidity of the pressure-sensitive adhesive sheet (the base) may mainly be provided by the first PET film layer A (having a thickness of 50 μm).

In the pressure-sensitive adhesive sheet of Comparative Example 9 that did not include the second PET film layer B on the rear side, force was easily applied to the aluminum layer compared to Examples when the release liner was detached from the pressure-sensitive adhesive layer. Thus, the aluminum layer may be easily plastically deformed. Accordingly, deformation that can be visually confirmed (for example, gentle undulation) occurred in some of the pressure-sensitive adhesive sheets of Comparative Example 9. The deformed pressure-sensitive sheet had wrinkles when attached to the object 91.

Comparative Example 10

The pressure-sensitive adhesive sheet of Comparative Example 10 had the deflection amount of 2 mm as a result of the deflection test, and thus the pressure-sensitive adhesive sheet was determined to have sufficient rigidity. However, the pressure-sensitive adhesive sheet of Comparative Example 10 did not include the second PET film layer B on the rear side of the base. The pressure-sensitive adhesive layer was formed on the aluminum layer. In the pressure-sensitive adhesive sheet of Comparative Example 10, the aluminum layer had a thickness of 30 μm, and thus the rigidity of the pressure-sensitive adhesive sheet may mainly be provided by the aluminum layer.

In the pressure-sensitive adhesive sheet of Comparative Example 10 that did not include the second PET film layer B on the rear side, force was easily applied to the aluminum layer compared to Examples when the release liner was detached from the pressure-sensitive adhesive layer. In addition, since the aluminum layer had the large thickness, the aluminum layer may be easily plastically deformed. Accordingly, deformation that can be visually confirmed (for example, gentle undulation) occurred in some of the pressure-sensitive adhesive sheets of Comparative Example 10. The deformed pressure-sensitive sheet had wrinkles when attached to the object 91.

Results of Wrinkle Test 2

The pressure-sensitive adhesive sheets in Examples 1 and 4 to 7 of Examples 1 to 7 did not have wrinkles when attached to the object 92 having the square protrusion. The pressure-sensitive adhesive sheets in Examples 1 and 4 to 7 each had the value of Ta/Tb within a range of 2.0 to 4.0. The pressure-sensitive adhesive sheets in Examples 1 and 4 to 7 each had high followability to difference in level. This may be because that the pressure-sensitive adhesive sheet (the base) having the value of Ta/Tb within the range of 2.0 to 4.0 can be easily stretched so as to conform to the shape of the object.

The invention claimed is:

1. A pressure-sensitive adhesive sheet comprising:
   a base including a metal layer, a first plastic film layer A, and a second plastic film layer B, the metal layer being positioned between the first plastic film layer A and the second plastic film layer B; and
   a pressure-sensitive adhesive layer on a surface of the second plastic film B, wherein
   the metal layer has a thickness of 2 μm to 15 μm,
   a total of a thickness Ta of the first plastic film layer A and a thickness Tb of the second plastic film layer B is within a range of 25 μm to 70 μm,
   wherein the base has a total thickness of 40 μm to 90 μm,
   the thickness Ta of the first plastic film layer A is larger than the thickness Tb of the second plastic film layer B,
   a ratio of the thickness Ta of the first plastic film layer A to the thickness Tb of the second plastic film layer B is within a range of 1.5 to 7.0, and
   the thickness of the metal layer is less than the thickness Tb of the second plastic film layer.

2. The pressure-sensitive adhesive sheet according to claim 1, wherein a ratio of the thickness Ta of the first plastic film layer A to the thickness Tb of the second plastic film layer B is within a range of 2.0 to 4.0.

3. The magnetic disk drive comprising:
   a magnetic disk unit including a magnetic disk;
   a head unit including a magnetic head configured to read or write information on the magnetic disk;
   a base member having a box like shape with an opening at one side and including a frame shaped end portion extending around the opening, the base member housing the magnetic disk unit and the head unit therein;
   a cover attached to the base member and covering the opening of the base member, the cover having an outer peripheral portion located away from an inner peripheral portion of the frame shaped end portion with a gap therebetween; and
   a cover seal attached over the frame shaped end portion and the cover such that the cover seal covers the gap, the cover seal being the pressure-sensitive adhesive sheet according to claim 2.

4. The pressure-sensitive adhesive sheet according to claim 1, wherein the pressure-sensitive adhesive sheet is a cover seal used in a magnetic disk drive.

5. The magnetic disk drive comprising:
   a magnetic disk unit including a magnetic disk;
   a head unit including a magnetic head configured to read or write information on the magnetic disk;
   a base member having a box like shape with an opening at one side and including a frame shaped end portion extending around the opening, the base member housing the magnetic disk unit and the head unit therein;
   a cover attached to the base member and covering the opening of the base member, the cover having an outer peripheral portion located away from an inner peripheral portion of the frame shaped end portion with a gap therebetween; and
   a cover seal attached over the frame shaped end portion and the cover such that the cover seal covers the gap, the cover seal being the pressure-sensitive adhesive sheet according to claim 4.

6. The pressure-sensitive adhesive sheet according to claim 1, wherein the pressure-sensitive adhesive sheet is a cover seal used in a magnetic disk drive, and
   the magnetic disk drive comprises:
   a magnetic disk unit including a magnetic disk;
   a head unit including a magnetic head configured to read or write information on the magnetic disk;
   a base member having a box like shape with an opening at one side and including a frame shaped end portion extending around the opening, the base member housing the magnetic disk unit and the head unit therein;
   a cover attached to the base member and covering the opening of the base member, the cover having an outer peripheral portion located away from an inner peripheral portion of the frame shaped end portion with a gap therebetween; and the cover seal attached over the frame shaped end portion and the cover such that the cover seal covers the gap.

7. A magnetic disk drive comprising:

a magnetic disk unit including a magnetic disk;

a head unit including a magnetic head configured to read or write information on the magnetic disk;

a base member having a box like shape with an opening at one side and including a frame shaped end portion extending around the opening, the base member housing the magnetic disk unit and the head unit therein;

a cover attached to the base member and covering the opening of the base member, the cover having an outer peripheral portion located away from an inner peripheral portion of the frame shaped end portion with a gap therebetween; and a cover seal attached over the frame shaped end portion and the cover such that the cover seal covers the gap, the cover seal being the pressure-sensitive adhesive sheet according to claim 1.

8. A cover seal for a magnetic disk drive, the cover seal comprising the pressure-sensitive adhesive sheet according to claim 1.

* * * * *